United States Patent
Long

(10) Patent No.: US 12,309,738 B2
(45) Date of Patent: May 20, 2025

(54) METHODS AND APPARATUSES FOR EVENT EXPOSURE OF LOCATION REPORTING FOR A TERMINAL DEVICE

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 17/761,633

(22) PCT Filed: Sep. 2, 2020

(86) PCT No.: PCT/EP2020/074509
§ 371 (c)(1),
(2) Date: Mar. 18, 2022

(87) PCT Pub. No.: WO2021/052761
PCT Pub. Date: Mar. 25, 2021

(65) Prior Publication Data
US 2022/0338156 A1    Oct. 20, 2022

(30) Foreign Application Priority Data
Sep. 20, 2019 (WO) ............... PCT/CN2019/107059

(51) Int. Cl.
*H04W 64/00* (2009.01)
*H04W 4/029* (2018.01)
*H04W 88/16* (2009.01)

(52) U.S. Cl.
CPC .......... *H04W 64/00* (2013.01); *H04W 4/029* (2018.02); *H04W 88/16* (2013.01)

(58) Field of Classification Search
CPC ...... H04W 64/00; H04W 4/029; H04W 88/16
See application file for complete search history.

(56) References Cited

U.S. PATENT DOCUMENTS

| 2019/0053010 A1 | 2/2019 | Edge et al. |
| 2019/0261260 A1 | 8/2019 | Dao et al. |
| 2020/0045767 A1* | 2/2020 | Velev ............... H04W 8/22 |

FOREIGN PATENT DOCUMENTS

CN    110249667 A    9/2019

OTHER PUBLICATIONS

SA WG2, "SP-181102: Presentation of TR 23.731: 'Study on Enhancement to the 5GC LoCation Services (Rel-16)' for approval," 3GPP TSG SA Meeting #SP-82, Dec. 12-14, 2018, Sorrento, Italy, 8 pages.

(Continued)

*Primary Examiner* — Nabil H Syed
*Assistant Examiner* — Cal J Eustaquio
(74) *Attorney, Agent, or Firm* — Withrow & Terranova, PLLC

(57) ABSTRACT

Methods and apparatuses for event exposure are disclosed. According to an embodiment, a network exposure function (NEF) entity receives, from an application function (AF) entity, a first request for subscribing to an event exposure of location reporting for a terminal device. The first request indicates at least one location reporting accuracy for 5th generation (5G) non-3rd generation partnership project (non-3GPP) access of the terminal device. The NEF entity sends, to a unified data management (UDM) entity, a second request for subscribing to an event exposure of location reporting for the terminal device. The second request indicates the at least one location reporting accuracy. The NEF entity receives, from an access and mobility management function (AMF) entity, location information of the terminal device and sends the location information of the terminal device to the AF entity.

21 Claims, 12 Drawing Sheets

(56) References Cited

OTHER PUBLICATIONS

Notice of Reasons for Rejection for Japanese Patent Application No. 2022-516286, mailed Apr. 11, 2023, 10 pages.
Author Unknown, "Technical Specification Group Services and System Aspects; Wireless and wireline convergence access support for the 5G System (5GS) (Release 16)," Technical Specification 23.316, Verion 16.0.0, Jun. 2019, 3GPP Organizational Partners, 63 pages.
Author Unknown, "Technical Specification Group Services and System Aspects; System Architecture for the 5G System; Stage 2 (Release 16)," Technical Specification 23.501, Verion 16.1.0, Jun. 2019, 3GPP Organizational Partners, 368 pages.
Author Unknown, "Technical Specification Group Services and System Aspects; Procedures for the 5G System; Stage 2 (Release 16)," Technical Specification 23.502, Version 16.1.1, Jun. 2019, 3GPP Organizational Partners, 495 pages.
Author Unknown, "Technical Specification Group Services and System Aspects; Procedures for the 5G System (5GS); Stage 2 (Release 16)," Technical Specification 23.502, Version 16.2.0, Sep. 2019, 3GPP Organizational Partners, 525 pages.
Author Unknown, "Technical Specification Group Services and System Aspects; Study on Enhancement to the 5GC LoCation Services (Release 16)," Technical Specification 23.731, Version 1.0.0, Dec. 2018, 3GPP Organizational Partners, 171 pages.
Author Unknown, "Technical Specification Group Core Network and Terminals; T8 reference point for Northbound APIs; (Release 16)," Technical Specification 29.122, Version 16.2.0, Jun. 2019, 3GPP Organizational Partners, 309 pages.
Author Unknown, "Technical Specification Group Core Network and Terminals; 5G System; Unified Data Management Services; Stage 3 (Release 16)," Technical Specification 29.503, Version 16.0.0, Jun. 2019, 3GPP Organizational Partners, 205 pages.
Author Unknown, "Technical Specification Group Core Network and Terminals; 5G System; Access and Mobility Management Services; Stage 3 (Release 16)," Technical Specification 29.518, Version 16.0.0, Jun. 2019, 3GPP Organizational Partners, 199 pages.
Author Unknown, "Technical Specification Group Core Network and Terminals; 5G System; Common Data Types for Service Based Interfaces; Stage 3 (Release 16)," Technical Specification 29.571, Version 16.0.0, Jun. 2019, 3GPP Organizational Partners, 79 pages.
Krishnan, et al., "The Line-Identification Option," Request for Comments 6788, Nov. 2012, Internet Engineering Task Force, 17 pages.
Qualcomm Incorporated, "S2-188064: Solution for Key issue 13: UE location information exposure," 3GPP SA WG2 Meeting #128Bis, Aug. 20-24, 2018, Sophia Antipolis, France, 3 pages.
International Search Report and Written Opinion for International Patent Application No. PCT/EP2020/074509, mailed Nov. 6, 2020, 22 pages.
International Preliminary Report on Patentability for International Patent Application No. PCT/EP2020/074509, mailed Dec. 10, 2021, 19 pages.
Author Unknown, "Technical Specification Group Services and System Aspects; Study on Enhancement to the 5GC LoCation Services (Release 16)," Technical Report 23.731, Version 0.8.0, Dec. 2018, 3GPP Organizational Partners, 182 pages.
First Office Action for Chinese Patent Application No. 202080065899.9, mailed Dec. 7, 2024, 14 pages.

\* cited by examiner

METHODS AND APPARATUSES FOR EVENT EXPOSURE OF LOCATION REPORTING FOR A TERMINAL DEVICE

This application is a 35 U.S.C. § 371 national phase filing of International Application No. PCT/EP2020/074509, filed Sep. 2, 2020, which claims the benefit of International Application No. PCT/CN2019/107059, filed Sep. 20, 2019, the disclosures of which are incorporated herein by reference in their entireties.

TECHNICAL FIELD

Embodiments of the disclosure generally relate to communication, and, more particularly, to methods and apparatuses for event exposure.

BACKGROUND

This section introduces aspects that may facilitate better understanding of the present disclosure. Accordingly, the statements of this section are to be read in this light and are not to be understood as admissions about what is in the prior art or what is not in the prior art.

FIG. 1 illustrates the architecture for the 5th generation (5G) system. As shown, the 5G system comprises a user equipment (UE), a (radio) access network ((R)AN), a user plane function (UPF), a data network (DN), an authentication server function (AUSF), an access and mobility management function (AMF), a session management function (SMF), a service communication proxy (SCP), a network slice selection function (NSSF), a network exposure function (NEF), a network repository function (NRF), a policy control function (PCF), a unified data management (UDM) and an application function (AF).

The 5G architecture is defined as service-based and the interaction between network functions (NFs) is represented in two ways. One way is a service-based representation, where NFs (e.g. AMF) within the control plane enables other authorized NFs to access their services. This representation also includes point-to-point reference points where necessary. The other way is a reference point representation, which shows the interaction existing between the NF services in the NFs described by point-to-point reference point (e.g. N11) between any two NFs (e.g. AMF and SMF).

The NEF supports external exposure of capabilities of NFs. External exposure can be categorized as monitoring capability, provisioning capability, policy/charging capability and analytics reporting capability. The monitoring capability is for monitoring of specific event for UE in the 5G system and making such monitoring events information available for external exposure via the NEF. The provisioning capability is for allowing an external party to provision of information which can be used for the UE in the 5G system. The policy/charging capability is for handling quality of service (QoS) and charging policy for the UE based on the request from an external party. The analytics reporting capability is for allowing an external party to fetch or subscribe/unsubscribe to analytics information generated by the 5G system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for event exposure.

According to a first aspect of the disclosure, there is provided a method performed by an NEF entity. The method may comprise receiving, from an AF entity, a first request for subscribing to an event exposure of location reporting for a terminal device. The first request may indicate at least one location reporting accuracy for 5G non-3rd generation partnership project (non-3GPP) access of the terminal device. The method may further comprise sending, to a UDM entity, a second request for subscribing to an event exposure of location reporting for the terminal device. The second request may indicate the at least one location reporting accuracy. The method may further comprise receiving, from an AMF entity, location information of the terminal device. The method may further comprise sending the location information of the terminal device to the AF entity.

In this way, the NEF entity can be enabled to support location reporting for a terminal device from possible 5G non-3GPP accesses.

In an embodiment of the disclosure, the at least one location reporting accuracy may comprise one or more of: a non-3GPP interworking function (N3IWF) used by the terminal device; a trusted non-3GPP gateway function (TNGF) used by the terminal device; an Internet protocol (IP) address of the terminal device; a user datagram protocol (UDP) port used by the terminal device; a wireline access gateway function (WAGF) used by the terminal device; a line identifier of an access point used by the terminal device; and a hybrid fiber-coaxial (HFC) identifier of an access point used by the terminal device.

In an embodiment of the disclosure, a list of Accuracy attribute taking a form of an array may be used in the first request to indicate the at least one location reporting accuracy.

In an embodiment of the disclosure, a non-3GPP accuracy (n3gppAccuracy) attribute may be used in the first request to indicate the at least one location reporting accuracy.

In an embodiment of the disclosure, a list of Accuracy attribute taking a form of an array may be used in the second request to indicate the at least one location reporting accuracy.

In an embodiment of the disclosure, an n3gppAccuracy attribute may be used in the second request to indicate the at least one location reporting accuracy.

In an embodiment of the disclosure, the location information of the terminal device may indicate one or more of: an N3IWF used by the terminal device; a TNGF used by the terminal device; an IP address of the terminal device; a UDP port used by the terminal device; a WAGF used by the terminal device; a line identifier of an access point used by the terminal device; and an HFC identifier of an access point used by the terminal device.

In an embodiment of the disclosure, the location information of the terminal device may indicate one of: an initial location of the terminal device immediately after the second request is sent to the UDM entity; and a new location of the terminal device when a location change of the terminal device occurs.

According to a second aspect of the disclosure, there is provided a method performed by a UDM entity. The method may comprise receiving, from an NEF entity, a first request for subscribing to an event exposure of location reporting for a terminal device. The first request may indicate at least one location reporting accuracy for non-3GPP access of the terminal device. The method may further comprise sending, to an AMF entity, a second request for subscribing to an event exposure of location reporting for the terminal device. The second request may indicate the at least one location reporting accuracy.

In this way, the UDM entity can be enabled to support location reporting for a terminal device from possible non-3GPP accesses.

In an embodiment of the disclosure, the at least one location reporting accuracy may comprise one or more of: an N3IWF used by the terminal device; a TNGF used by the terminal device; an IP address of the terminal device; a UDP port used by the terminal device; a WAGF used by the terminal device; a line identifier of an access point used by the terminal device; and an HFC identifier of an access point used by the terminal device.

In an embodiment of the disclosure, a list of Accuracy attribute taking a form of an array may be used in the first request to indicate the at least one location reporting accuracy.

In an embodiment of the disclosure, an n3gppAccuracy attribute may be used in the first request to indicate the at least one location reporting accuracy.

In an embodiment of the disclosure, a locationFilterList attribute of an AmfEvent data structure may be reused in the second request to indicate the at least one location reporting accuracy.

According to a third aspect of the disclosure, there is provided a method performed by an AMF entity. The method may comprise receiving, from a UDM entity, a request for subscribing to an event exposure of location reporting for a terminal device. The request may indicate at least one location reporting accuracy for non-3GPP access of the terminal device through TNGF and/or WAGF. The method may further comprise determining location information of the terminal device based on the request. The method may further comprise reporting the location information of the terminal device to an NEF entity.

In this way, the AMF entity can be enabled to support location reporting for a terminal device from possible non-3GPP accesses through TNGF and/or WAGF.

In an embodiment of the disclosure, the at least one location reporting accuracy may comprise one or more of: a TNGF used by the terminal device; an IP address of the terminal device; a UDP port used by the terminal device; a WAGF used by the terminal device; a line identifier of an access point used by the terminal device; and an HFC identifier of an access point used by the terminal device.

In an embodiment of the disclosure, a locationFilterList attribute of an AmfEvent data structure may be reused in the request to indicate the at least one location reporting accuracy.

In an embodiment of the disclosure, the location information of the terminal device may indicate one or more of: a TNGF used by the terminal device; an IP address of the terminal device; a UDP port used by the terminal device; a WAGF used by the terminal device; a line identifier of an access point used by the terminal device; and an HFC identifier of an access point used by the terminal device.

In an embodiment of the disclosure, determining the location information of the terminal device may comprise determining, as the location information, information about an initial location of the terminal device immediately after the request is received from the UDM entity.

In an embodiment of the disclosure, determining the location information of the terminal device may comprise monitoring whether a location change of the terminal device occurs. Determining the location information of the terminal device may comprise, when a location change of the terminal device occurs, determining, as the location information, information about a new location of the terminal device.

According to a fourth aspect of the disclosure, there is provided a method performed by an AF entity. The method may comprise sending, to an NEF entity, a request for subscribing to an event exposure of location reporting for a terminal device. The request may indicate at least one location reporting accuracy for 5G non-3GPP access of the terminal device. The method may further comprise receiving location information of the terminal device from the NEF entity.

In this way, the AF entity can be enabled to support location reporting for a terminal device from possible 5G non-3GPP accesses.

In an embodiment of the disclosure, the at least one location reporting accuracy may comprise one or more of: an N3IWF used by the terminal device; a TNGF used by the terminal device; an IP address of the terminal device; a UDP port used by the terminal device; a WAGF used by the terminal device; a line identifier of an access point used by the terminal device; and a HFC identifier of an access point used by the terminal device.

In an embodiment of the disclosure, a list of Accuracy attribute taking a form of an array may be used in the request to indicate the at least one location reporting accuracy.

In an embodiment of the disclosure, an n3gppAccuracy attribute may be used in the request to indicate the at least one location reporting accuracy.

In an embodiment of the disclosure, the location information of the terminal device may indicate one or more of: an N3IWF used by the terminal device; a TNGF used by the terminal device; an IP address of the terminal device; a UDP port used by the terminal device; a WAGF used by the terminal device; a line identifier of an access point used by the terminal device; and an HFC identifier of an access point used by the terminal device.

In an embodiment of the disclosure, the location information of the terminal device may indicate one of: an initial location of the terminal device immediately after the request is sent to the NEF entity; and a new location of the terminal device when a location change of the terminal device occurs.

According to a fifth aspect of the disclosure, there is provided an NEF entity. The NEF entity may comprise at least one processor and at least one memory. The at least one memory may contain instructions executable by the at least one processor, whereby the NEF entity may be operative to receive, from an AF entity, a first request for subscribing to an event exposure of location reporting for a terminal device. The first request may indicate at least one location reporting accuracy for 5G non-3GPP access of the terminal device. The NEF entity may be further operative to send, to a UDM entity, a second request for subscribing to an event exposure of location reporting for the terminal device. The second request may indicate the at least one location reporting accuracy. The NEF entity may be further operative to receive, from an AMF entity, location information of the terminal device. The NEF entity may be further operative to send the location information of the terminal device to the AF entity.

In an embodiment of the disclosure, the NEF entity may be operative to perform the method according to the above first aspect.

According to a sixth aspect of the disclosure, there is provided a UDM entity. The UDM entity may comprise at least one processor and at least one memory. The at least one memory may contain instructions executable by the at least one processor, whereby the UDM entity may be operative to receive, from an NEF entity, a first request for subscribing to an event exposure of location reporting for a terminal device. The first request may indicate at least one location reporting accuracy for non-3GPP access of the terminal device. The UDM entity may be further operative to send, to an AMF entity, a second request for subscribing to an event exposure of location reporting for the terminal device. The second request may indicate the at least one location reporting accuracy.

In an embodiment of the disclosure, the UDM entity may be operative to perform the method according to the above second aspect.

According to a seventh aspect of the disclosure, there is provided an AMF entity. The AMF entity may comprise at least one processor and at least one memory. The at least one memory may contain instructions executable by the at least one processor, whereby the AMF entity may be operative to receive, from a UDM entity, a request for subscribing to an event exposure of location reporting for a terminal device. The request may indicate at least one location reporting accuracy for non-3GPP access of the terminal device through TNGF and/or WAGF. The AMF entity may be further operative to determine location information of the terminal device based on the request. The AMF entity may be further operative to report the location information of the terminal device to an NEF entity.

In an embodiment of the disclosure, the AMF entity may be operative to perform the method according to the above third aspect.

According to an eighth aspect of the disclosure, there is provided an AF entity. The AF entity may comprise at least one processor and at least one memory. The at least one memory may contain instructions executable by the at least one processor, whereby the AF entity may be operative to send, to an NEF entity, a request for subscribing to an event exposure of location reporting for a terminal device. The request may indicate at least one location reporting accuracy for 5G non-3GPP access of the terminal device. The AF entity may be further operative to receive location information of the terminal device from the NEF entity.

In an embodiment of the disclosure, the AF entity may be operative to perform the method according to the above fourth aspect.

According to a ninth aspect of the disclosure, there is provided a computer program product. The computer program product may comprise instructions which when executed by at least one processor, cause the at least one processor to perform the method according to any of the above first to fourth aspects.

According to a tenth aspect of the disclosure, there is provided a computer readable storage medium. The computer readable storage medium may comprise instructions which when executed by at least one processor, cause the at least one processor to perform the method according to any of the above first to fourth aspects.

According to an eleventh aspect of the disclosure, there is provided an NEF entity. The NEF entity may comprise a first reception module for receiving, from an AF entity, a first request for subscribing to an event exposure of location reporting for a terminal device. The first request may indicate at least one location reporting accuracy for 5G non-3GPP access of the terminal device. The NEF entity may further comprise a first sending module for sending, to a UDM entity, a second request for subscribing to an event exposure of location reporting for the terminal device. The second request may indicate the at least one location reporting accuracy. The NEF entity may further comprise a second reception module for receiving, from an AMF entity, location information of the terminal device. The NEF entity may further comprise a second sending module for sending the location information of the terminal device to the AF entity.

According to a twelfth aspect of the disclosure, there is provided a UDM entity. The UDM entity may comprise a reception module for receiving, from an NEF entity, a first request for subscribing to an event exposure of location reporting for a terminal device. The first request may indicate at least one location reporting accuracy for non-3GPP access of the terminal device. The UDM entity may further comprise a sending module for sending, to an AMF entity, a second request for subscribing to an event exposure of location reporting for the terminal device. The second request may indicate the at least one location reporting accuracy.

According to a thirteenth aspect of the disclosure, there is provided an AMF entity. The AMF entity may comprise a reception module for receiving, from a UDM entity, a request for subscribing to an event exposure of location reporting for a terminal device. The request may indicate at least one location reporting accuracy for non-3GPP access of the terminal device through TNGF and/or WAGF. The AMF entity may further comprise a determination module for determining location information of the terminal device based on the request. The AMF entity may further comprise a reporting module for reporting the location information of the terminal device to an NEF entity.

According to an fourteenth aspect of the disclosure, there is provided an AF entity. The AF entity may comprise a sending module for sending, to an NEF entity, a request for subscribing to an event exposure of location reporting for a terminal device. The request may indicate at least one location reporting accuracy for 5G non-3GPP access of the terminal device. The AF entity may further comprise a reception module for receiving location information of the terminal device from the NEF entity.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
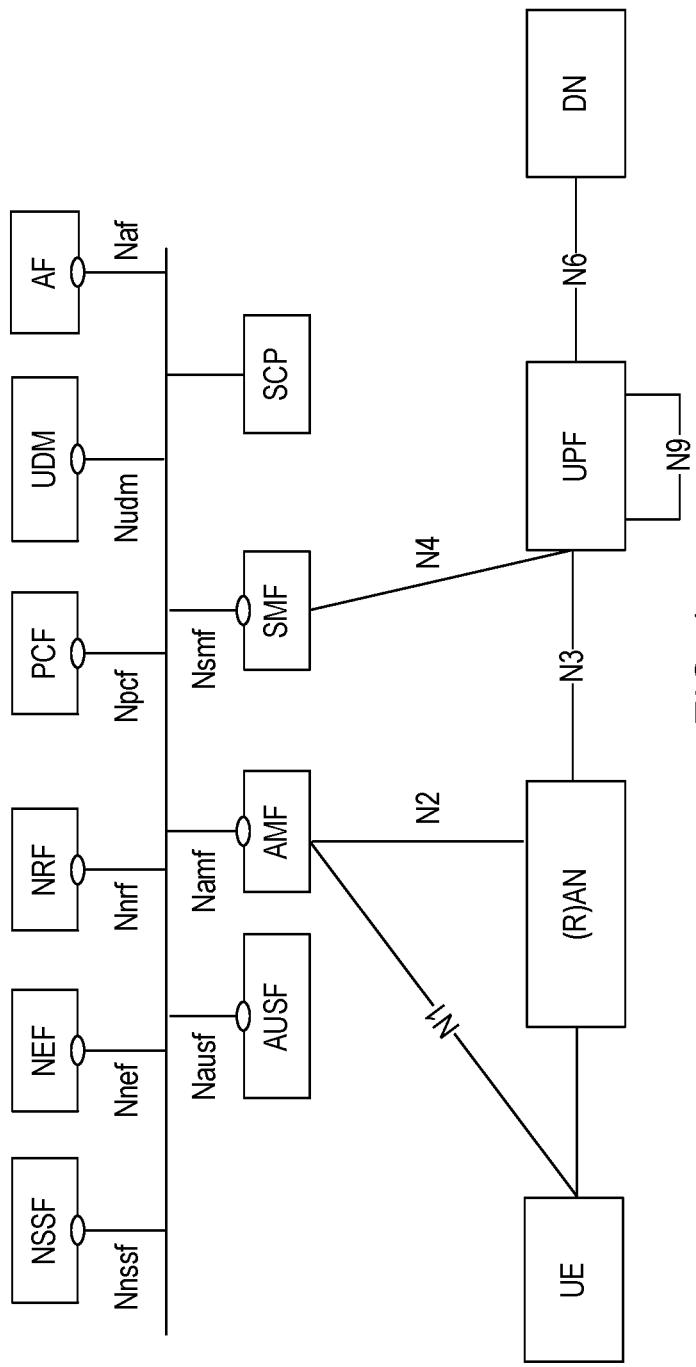
FIG. 1 is a diagram illustrating the architecture for the 5G system.

One of the nodes depicted in FIG. 1 is the access network (AN), which could be wireless based, or wireline based. A typical wireless access network is the 3GPP defined radio access network (RAN). The following types of non-3GPP access networks are defined: untrusted non-3GPP access networks; trusted non-3GPP access networks; and wireline access networks. The 5G core network supports connectivity of UEs via non-3GPP access networks, e.g. wireless local area network (WLAN) access networks.

Figure 2:
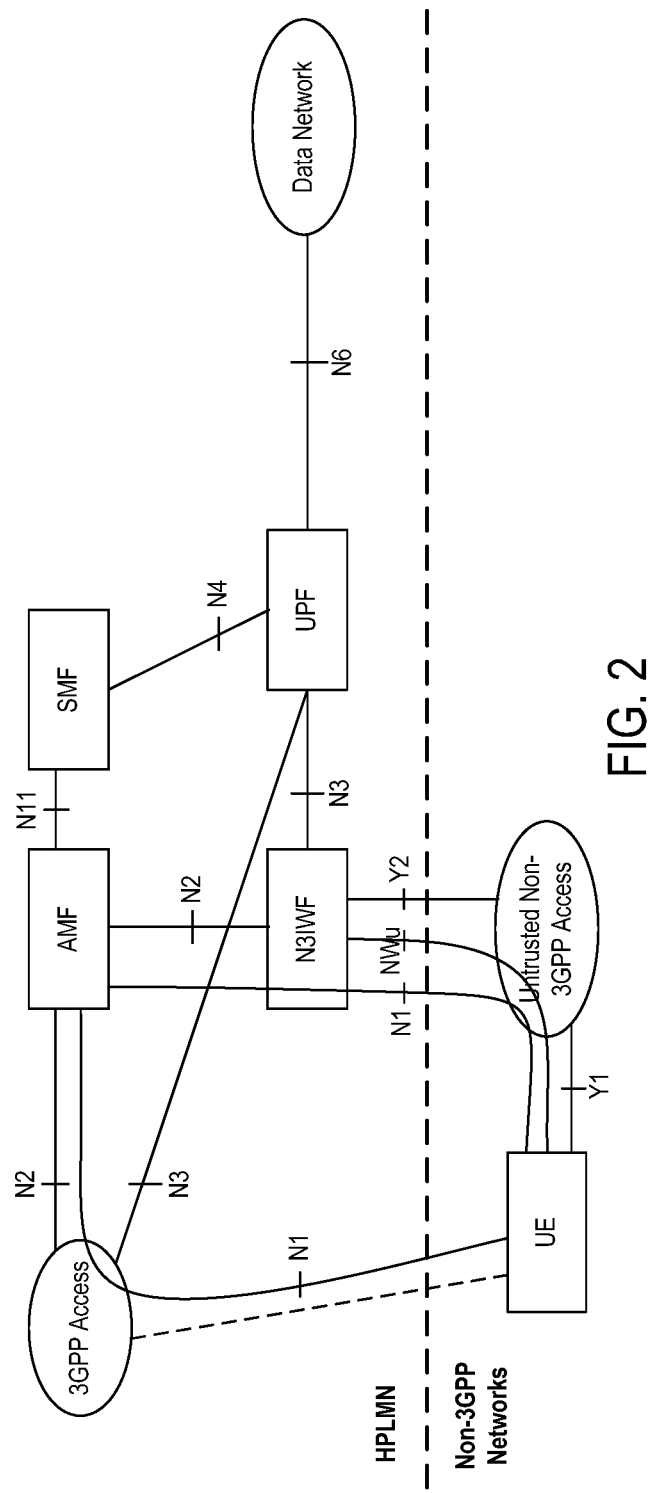
FIG. 2 is a diagram illustrating the architecture for the 5G core network with untrusted non-3GPP access.
Figure 3:
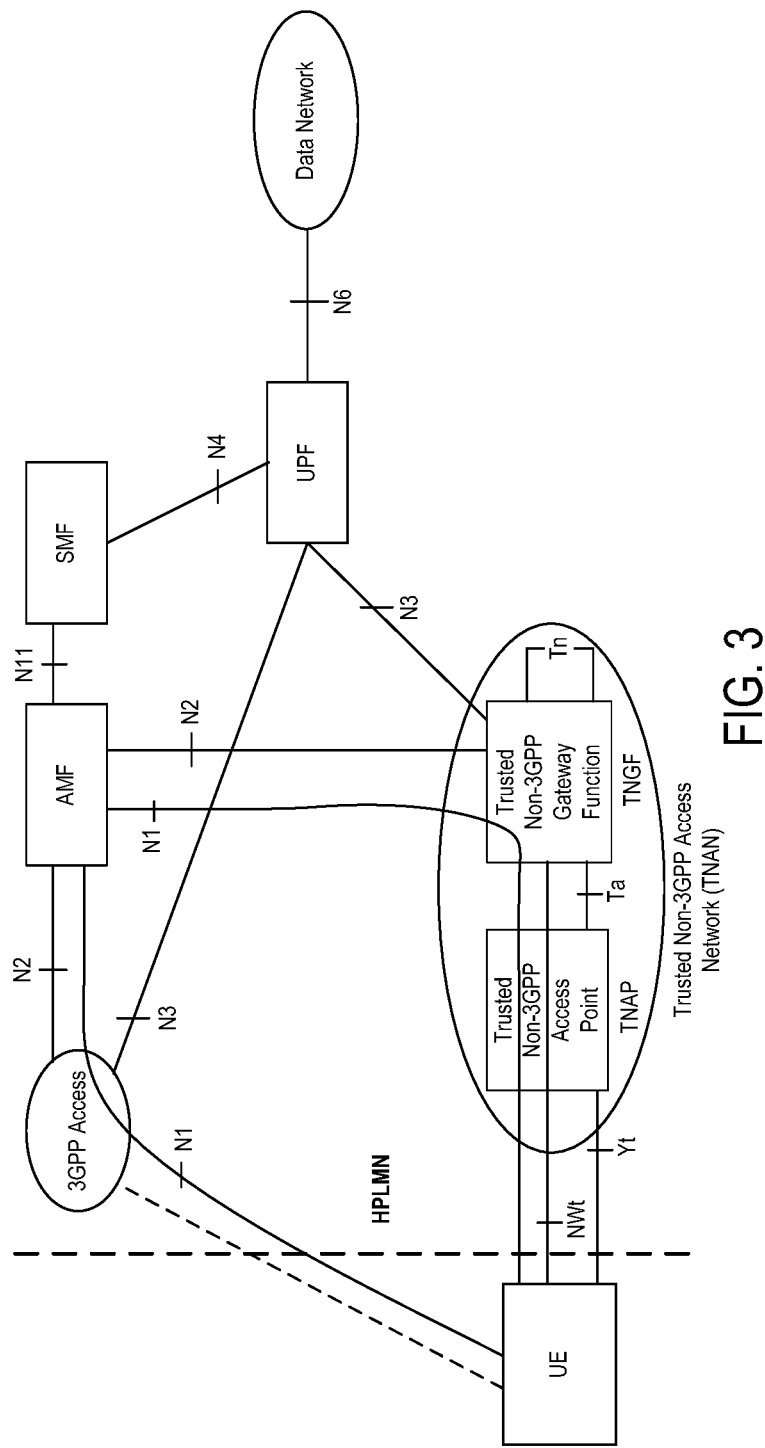
FIG. 3 is a diagram illustrating the architecture for the 5G core network with trusted non-3GPP access.

The 5G core network supports both untrusted non-3GPP access networks as shown in FIG. 2 and trusted non-3GPP access networks (TNANs) as shown in FIG. 3. An untrusted non-3GPP access network shall be connected to the 5G core network via a non-3GPP interworking function (N3IWF), whereas a trusted non-3GPP access network shall be connected to the 5G core network via a trusted non-3GPP gateway function (TNGF). Both the N3IWF and the TNGF interface with the 5G core network control plane (CP) and user plane (UP) functions via the N2 and N3 interfaces, respectively.

Figure 4:
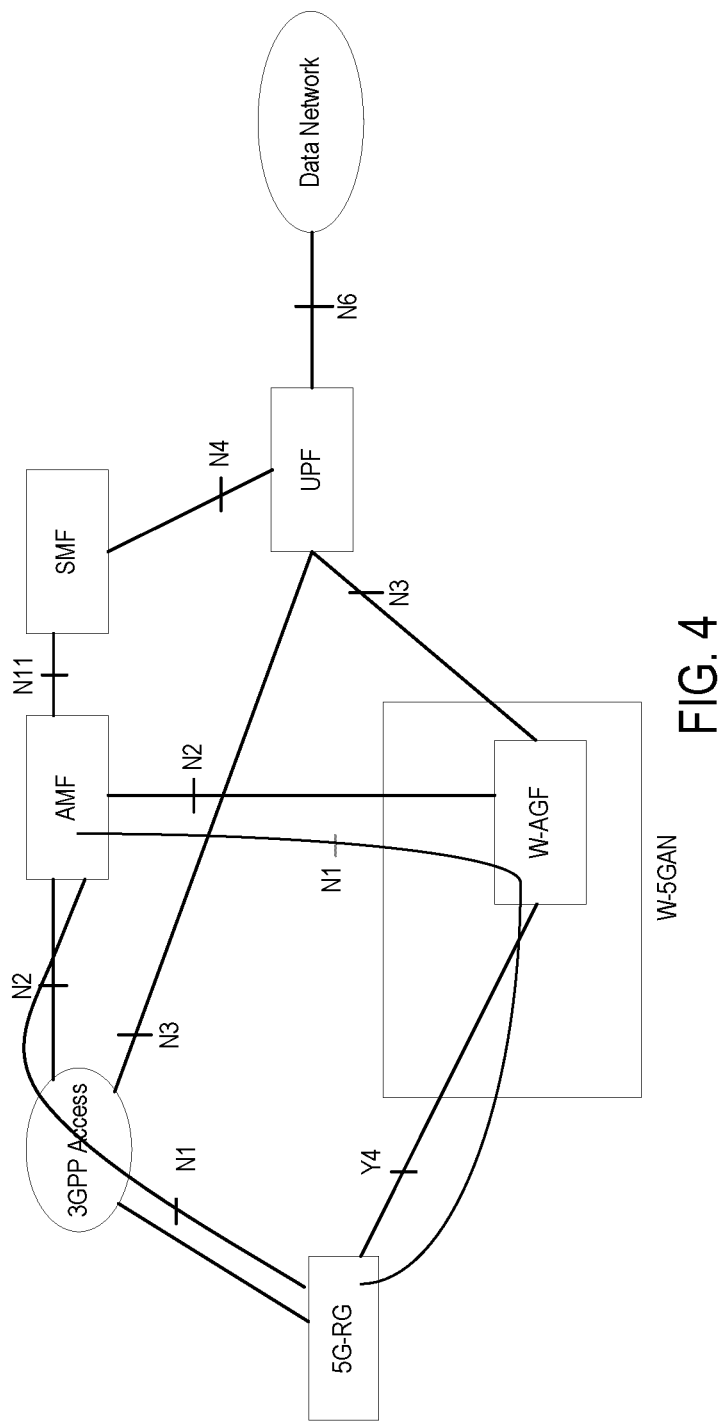
FIG. 4 is a diagram illustrating the architecture for the 5G core network for 5G-RG with wireline 5G access network and NG RAN.

FIG. 4 illustrates the architecture for the 5G core network for 5G residential gateway (5G-RG) with wireline 5G access network and next generation (NG) RAN. As shown, wireline 5G access network shall be connected to the 5G core network via a wireline access gateway function (W-AGF). The W-AGF interfaces the 5G core network CP and UP functions via N2 and N3 interfaces, respectively. For the scenario of 5G-RG connected via NG RAN, the specification for UE are applicable as defined for UE connected to 5G core (5GC) via NG RAN unless differently specified. When a 5G-RG is connected via a NG-RAN and via a wireline 5G access network (W-5GAN), multiple N1 instances shall exist for the 5G-RG, i.e. there shall be one N1 instance over NG-RAN and one N1 instance over W-5GAN.

Figure 5:
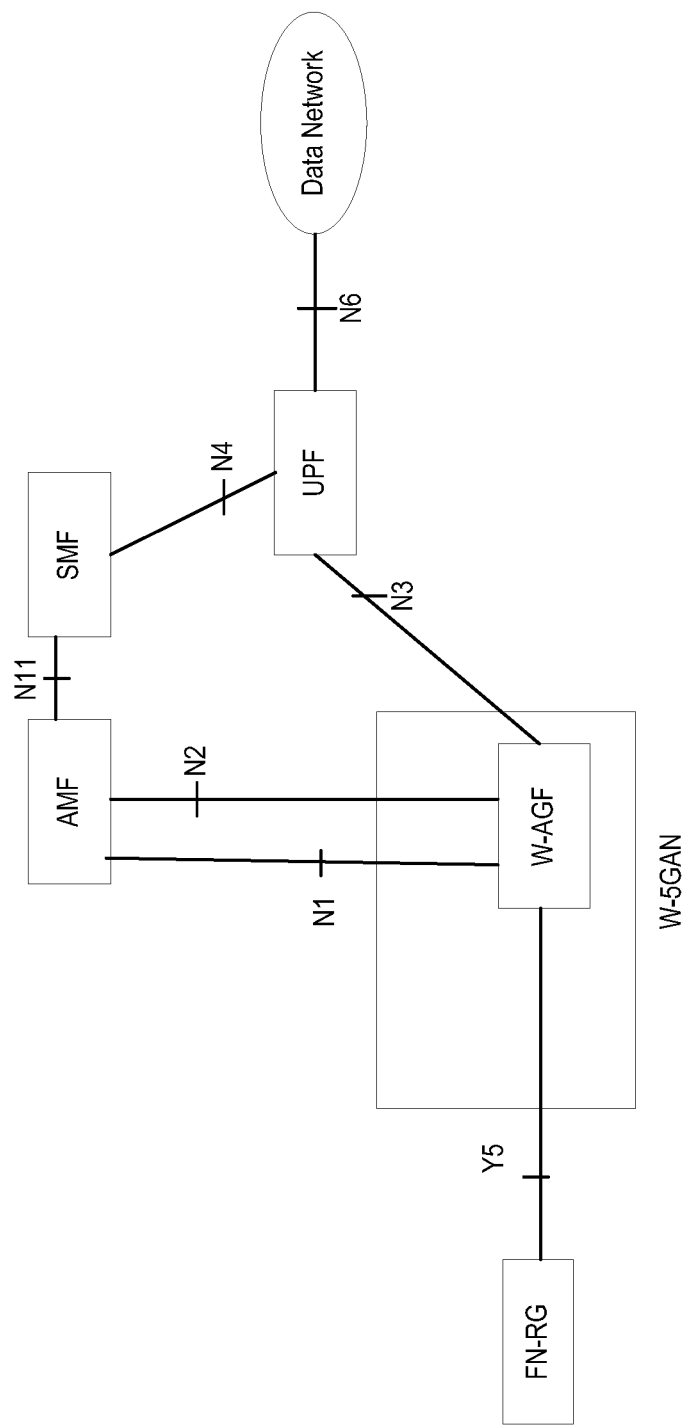
FIG. 5 is a diagram illustrating the architecture for the 5G core network for FN-RG with wireline 5G access network and NG RAN.

FIG. 5 illustrates the architecture for the 5G core network for fixed network residential gateway (FN-RG) with wireline 5G access network and NG RAN. As shown, for the scenario of FN-RG which is not 5G capable and is connected via W-5GAN to 5GC, the W-AGF provides the N1 interface to AMF on behalf of the FN-RG.

A UE connected to a 5G-RG or FN-RG can access to the 5GC via the N3IWF or via the TNGF, where the combination of 5G-RG/FN-RG, W-5GAN and UPF serving the 5G-RG or FN-RG is acting respectively as untrusted non-3GPP access network or as a trusted non-3GPP access network. For example, a UE is connecting to 5G-RG by means of WLAN radio access and connected to 5GC via N3IWF.

With respect to NEF network event exposure, monitoring capability is comprised of means that allow the identification of the 5G NF suitable for configuring the specific monitoring events, detect the monitoring event, and report the monitoring event to the authorized external party. Monitoring capability can be used for exposing UE's mobility management context such as UE location, reachability, roaming status, and loss of connectivity. AMF stores UE reachability request parameter for AMF (URRP-AMF) information in the mobility management (MM) context to determine the NFs that are authorized to receive direct notifications from the AMF. UDM stores URRP-AMF information locally to determine authorized monitoring requests when forwarding indirect notifications.

FIG. 4.2.3-5 of 3GPP technical specification (TS) 23.501 V16.1.0 illustrates the architecture for NEF. As shown in this figure, the monitoring events feature is intended for monitoring of specific events in the 3GPP system and making such monitoring events information reported via the NEF. It is comprised of means that allow NFs in the 5G system (5GS) for configuring the specific events, the event detection, and the event reporting to the requested party.

To support monitoring features in roaming scenarios, a roaming agreement needs to be made between the home public land mobile network (HPLMN) and the visiting PLMN (VPLMN). Intermediate NEF (I-NEF) may be deployed as defined. If I-NEF is deployed, the AMF and SMF in the VPLMN provide the configuration for a given monitor event at I-NEF and make monitoring event reported via the I-NEF. The I-NEF is aware of the monitoring event and makes it reported via the NEF.

The set of capabilities required for monitoring shall be accessible via NEF to NFs in the 5GS. Monitoring Events via the UDM, the AMF, the SMF and the gateway mobile location center (GMLC) enables NEF to configure a given monitor event at UDM, AMF, SMF or GMLC, and reporting of the event via UDM and/or AMF or GMLC. Depending on the specific monitoring event or information, it is the AMF, GMLC or the UDM that is aware of the monitoring event or information and makes it reported via the NEF. Table 4.15.3.1-1 of 3GPP TS 23.502 V16.1.1 shows the monitoring events currently supported.

As shown in FIG. 4.2.3-5 of 3GPP TS 23.501 V16.1.0, the NEF exposes application programming interface (API) for external AF (service capability server/application server (SCS/AS)) for subscription of events defined in Table 4.15.3.1-1 of 3GPP TS 23.502 V16.1.1. The data structure defined for MonitoringEventSubscription can be obtained from Table 5.3.2.1.2-1 of 3GPP TS 29.122 V16.2.0. The supported accuracy level related to location report event can be obtained from Table 5.3.2.4.7-1 of 3GPP TS 29.122 V16.2.0.

With respect to UDM network event exposure, the following monitoring events (not exhaustive): loss of connectivity, UE reachability, location reporting, change of international mobile subscriber identity-international mobile equipment identity (IMSI-IMEI) (software version, SV) association, roaming status, communication failure and availability after delivery status notification (DNN) failure are applicable for the monitoring event configuration via UDM for an individual UE or a group of UEs or any UE.

For the Nudm_EventExposure service, the following service operations are defined: Subscribe; Unsubscribe; Notify; and ModifySubscription. The Nudm_EventExposure service is used by consumer NFs (e.g. NEF) to subscribe to notifications of event occurrence by means of the Subscribe service operation. For events that can be detected by the AMF, the UDM makes use of the appropriate AMF service operation to subscribe on behalf of the consumer NF (e.g. NEF). The Nudm_EventExposure service is also used by the consumer NFs (e.g. NEF) that have previously subscribed to notifications, to unsubscribe by means of the Unsubscribe service operation. For events that can be detected by the AMF, the UDM makes use of the appropriate AMF service operation to unsubscribe on behalf of the consumer NF (e.g. NEF). The Nudm_EventExposure service is also used by the subscribed consumer NFs (e.g. NEF) to get notified by the UDM when a subscribed event occurs at the UDM by means of the Notify service operation. For subscribed events that can occur at the AMF, the consumer NF (e.g. NEF) makes use of the corresponding AMF service operation to get notified by the AMF directly without UDM involvement. The Nudm_EventExposure service is also used by the subscribed consumer NFs (e.g. NEF) to modify an existing subscription by means of the ModifySubscription service operation.

FIG. 5.5.2.2.2-1 of 3GPP TS 29.503 V16.0.0 shows a scenario where the NF service consumer sends a request to the UDM to subscribe to notifications of event occurrence. The request contains a callback uniform resource identifier (URI), the type of event that is monitored and additional information e.g. event filters and reporting options. More details can be obtained from clause 5.5.2.2.2 of 3GPP TS 29.503 V16.0.0. Table 6.4.6.2.2-1, Table 6.4.6.2.3-1, Table 6.4.6.2.10-1 and Table 6.4.6.3.4-1 of 3GPP TS 29.503 V16.0.0 defines the EeSubscription data structure and especially the data structure related to location report.

With respect to AMF network event exposure, FIG. 5.3.2.2.2-1 of 3GPP TS 29.518 V16.0.0 illustrates subscribing event notification from AMF. More details can be obtained from clause 5.3.2.2.2 of 3GPP TS 29.518 V16.0.0. Table 6.2.6.2.2-1 of 3GPP TS 29.518 V16.0.0 defines the data structure to subscribe event subscription from AMF. Table 6.2.6.2.3-1 and Table 6.2.6.3.5-1 of 3GPP TS 29.518 V16.0.0 show the configuration information for location report event. Table 6.2.6.2.5-1 of 3GPP TS 29.518 V16.0.0 and Table 5.4.4.10-1 of 3GPP TS 29.571 V16.0.0 show data structure for location change report.

Based on the above, for the location reporting event exposed by NEF/UDM/AMF, the location report for all possible 5G non-3GPP accesses is not well supported. As a first problem, from Table 5.3.2.4.7-1 of 3GPP TS 29.122 V16.2.0, for the location accuracy supported by NEF/service capability exposure function (SCEF), only trusted WLAN access network (TWAN) is related to 4th generation (4G) non-3GPP access, but other 5G non-3GPP access location accuracy such as un-trusted non-3GPP access and wireline non-3GPP access are not supported. So, it is a problem that the AF (SCS/AS) cannot subscribe location change events notification for UEs from all possible 5G non-3GPP accesses.

As a second problem, from Table 6.4.6.3.4-1 of 3GPP TS 29.503 V16.0.0, for location accuracy supported by UDM, it is even worse that only CELL LEVEL or tracking area level (TA LEVEL) is supported for the location accuracy which is only applicable for 3GPP access. This implicitly limits the location reporting event only for 5G 3GPP access. So, it is not possible for UDM to expose location change reporting to allow the external service consumer such as AF through NEF to subscribe location change event notification for UEs from all possible 5G non-3GPP accesses.

As a third problem, from Table 6.2.6.3.5-1 of 3GPP TS 29.518 V16.0.0, for location filter supported by AMF, only N3IWF level accuracy is supported for non-3GPP access, but other 5G non-3GPP access location accuracy such as trusted 5G non-3GPP access and wireline 5G non-3GPP access are not supported. So, it is not possible for AMF to expose location change reporting to allow the external service consumer such as AF through NEF and UDM to subscribe location change event notification for UEs from all possible 5G non-3GPP accesses.

Based on the above three problems, it is apparent that there exists the overall problem that from end to end use case point of view for location change events, it does not work for network event exposure of location change event when comes to UE from all possible 5G non-3GPP accesses.

The present disclosure proposes an improved solution for event exposure. As an exemplary example, the solution may be applied to the communication system shown in FIG. 1. The functional description of the entities shown in FIG. 1 is specified in clause 6 of 3GPP TS 23.501, which is incorporated herein by reference in its entirety.

Note that within the context of this disclosure, the term terminal device (or UE) used herein may also be referred to as, for example, access terminal, mobile station, mobile unit, subscriber station, or the like. It may refer to any (a stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a terminal device (or UE) may represent a machine or other device that performs monitoring and/or measurements, and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node (or network entity) in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

Figure 6:
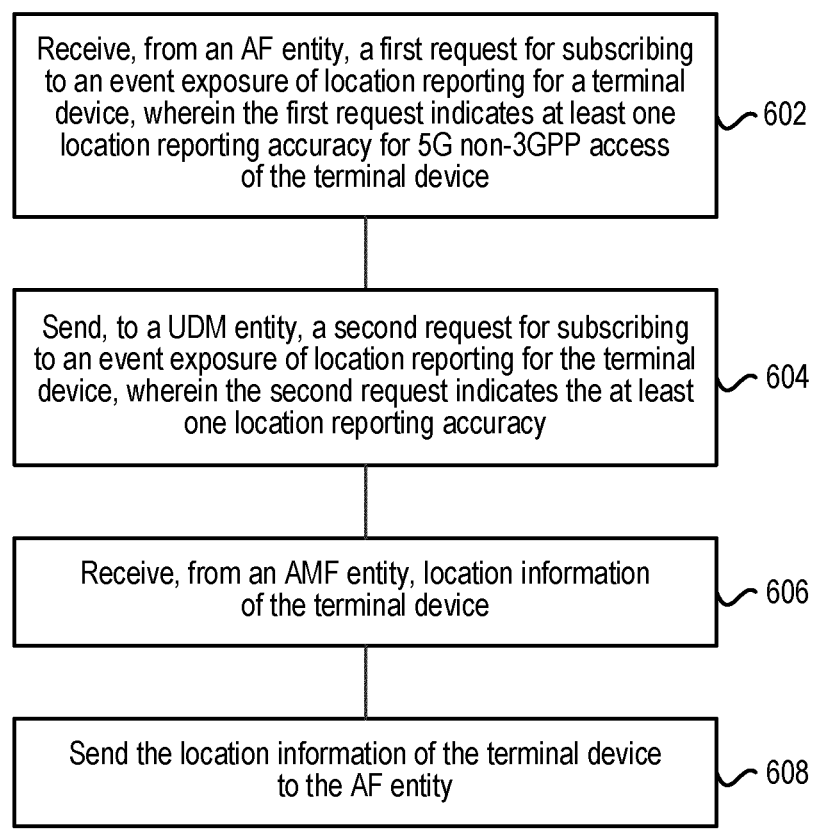
FIG. 6 is a flowchart illustrating a method implemented at an NEF entity according to an embodiment of the disclosure.

FIG. 6 is a flowchart illustrating a method implemented at an NEF entity according to an embodiment of the disclosure. At block 602, the NEF entity receives, from an AF entity, a first request for subscribing to an event exposure of location reporting for a terminal device. The first request indicates at least one location reporting accuracy for 5G non-3GPP access of the terminal device. The at least one location reporting accuracy may include any one or any combination of: an N3IWF used by the terminal device; a TNGF used by the terminal device; an Internet protocol (IP) address of the terminal device; a user datagram protocol (UDP) port used by the terminal device; a WAGF used by the terminal device; a line identifier of an access point used by the terminal device; and a hybrid fiber-coaxial (HFC) identifier of an access point used by the terminal device. As an option, a list of Accuracy attribute taking a form of an array may be used in the first request to indicate the at least one location reporting accuracy. As another option, a non-3GPP accuracy (n3gppAccuracy) attribute may be used in the first request to indicate the at least one location reporting accuracy. Note that the at least one location reporting accuracy may be indicated in the first request by any other suitable manner. As an exemplary example, the first request may be an Nnef_EventExposure_Subscribe request.

At block 604, the NEF entity sends, to a UDM entity, a second request for subscribing to an event exposure of location reporting for the terminal device. The second request indicates the at least one location reporting accuracy indicated by the first request. As an option, a list of Accuracy attribute taking a form of an array may be used in the second request to indicate the at least one location reporting accuracy. As another option, an n3gppAccuracy attribute may be used in the second request to indicate the at least one location reporting accuracy. Note that the at least one location reporting accuracy may be indicated in the second request by any other suitable manner. As an exemplary example, the second request may be an Nudm_EventExposure_Subscribe request.

At block 606, the NEF entity receives, from an AMF entity, location information of the terminal device. The operations performed by the AMF entity will be described later. Since the at least one location reporting accuracy is indicated by the second request for 5G non-3GPP access of the terminal device, the location information of the terminal device may indicate any one or any combination of: an N3IWF used by the terminal device; a TNGF used by the terminal device; an IP address of the terminal device; a UDP port used by the terminal device; a WAGF used by the terminal device; a line identifier of an access point used by the terminal device; and an HFC identifier of an access point used by the terminal device. If an immediate reporting is configured in the first and second requests, the location information of the terminal device may indicate an initial location of the terminal device immediately after the second request is sent to the UDM entity. If a continuous reporting is configured in the first and second requests, the location information of the terminal device may indicate a new location of the terminal device when a location change of the terminal device occurs. Thus, either one of the initial location and the new location may be represented by any one or any combination of: an identifier of the N3IWF used by the terminal device; an identifier of the TNGF used by the terminal device; an IP address of the terminal device; a UDP port used by the terminal device; an identifier of the WAGF used by the terminal device; a line identifier of an access point used by the terminal device; and an HFC identifier of an access point used by the terminal device. As an exemplary example, the location information of the terminal device may be received from the AMF entity in an Namf_EventExposure_Notify message.

At block 608, the NEF entity sends the location information of the terminal device to the AF entity. As an exemplary example, the location information of the terminal device may be sent to the AF entity in an Nnef_EventExposure_Notify message. With the method of FIG. 6, the NEF entity can be enabled to support location reporting for a terminal device from possible 5G non-3GPP accesses.

Figure 7:
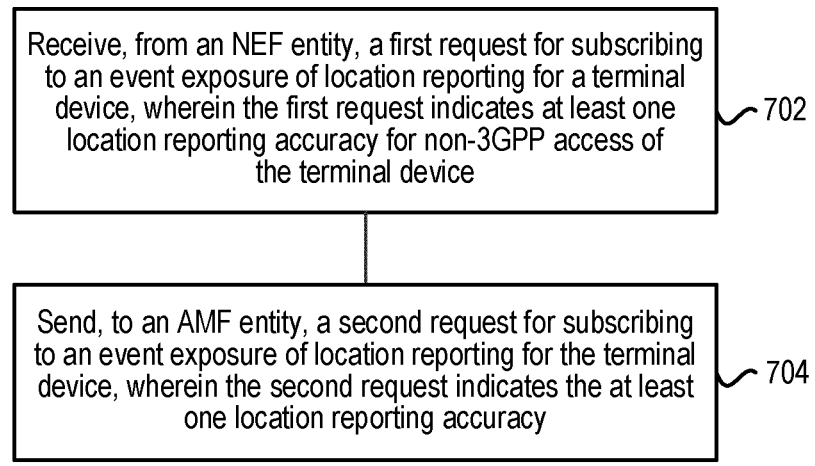
FIG. 7 is a flowchart illustrating a method implemented at a UDM entity according to an embodiment of the disclosure.

FIG. 7 is a flowchart illustrating a method implemented at a UDM entity according to an embodiment of the disclosure. At block 702, the UDM entity receives, from an NEF entity, a first request for subscribing to an event exposure of location reporting for a terminal device. The first request indicates at least one location reporting accuracy for non-3GPP access of the terminal device. The at least one location reporting accuracy may include any one or any combination of: an N3IWF used by the terminal device; a TNGF used by the terminal device; an IP address of the terminal device; a UDP port used by the terminal device; a WAGF used by the terminal device; a line identifier of an access point used by the terminal device; and an HFC identifier of an access point used by the terminal device. As an option, a list of Accuracy attribute taking a form of an array may be used in the first request to indicate the at least one location reporting accuracy. As another option, an n3gppAccuracy attribute may be used in the first request to indicate the at least one location reporting accuracy. Note that the at least one location reporting accuracy may be indicated in the first request by any other suitable manner. As an exemplar example, the first request may be an Nudm_EventExposure_Subscribe request.

At block 704, the UDM entity sends, to an AMF entity, a second request for subscribing to an event exposure of location reporting for the terminal device. The second request indicates the at least one location reporting accuracy indicated by the first request. For example, a locationFilterList attribute of an AmfEvent data structure may be reused in the second request to indicate the at least one location reporting accuracy. Note that the at least one location reporting accuracy may be indicated in the second request by any other suitable manner. As an exemplar example, the second request may be an Namf_EventExposure_Subscribe request. With the method of FIG. 7, the UDM entity can be enabled to support location reporting for a terminal device from possible non-3GPP accesses.

Figure 8:
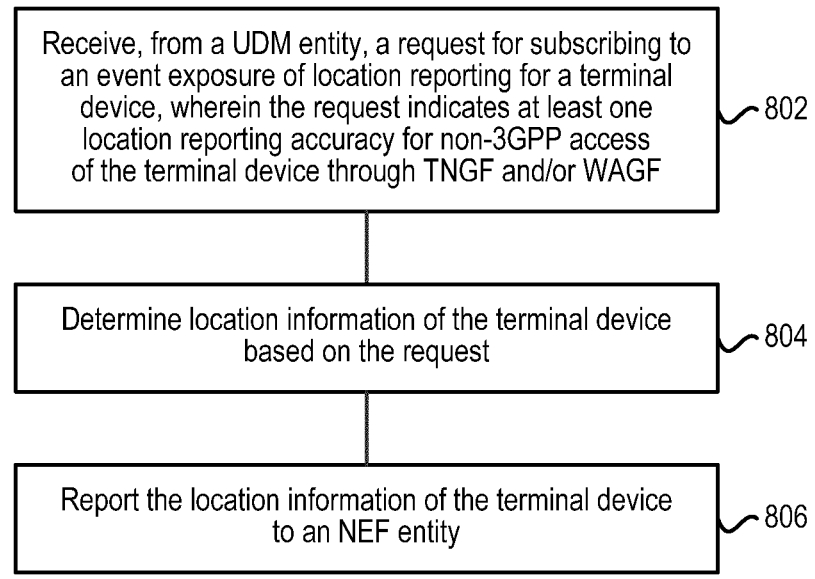
FIG. 8 is a flowchart illustrating a method implemented at an AMF entity according to an embodiment of the disclosure.

FIG. 8 is a flowchart illustrating a method implemented at an AMF entity according to an embodiment of the disclosure. At block 802, the AMF entity receives, from a UDM entity, a request for subscribing to an event exposure of location reporting for a terminal device. The request indicates at least one location reporting accuracy for non-3GPP access of the terminal device through TNGF and/or WAGF. The at least one location reporting accuracy may include any one or any combination of: a TNGF used by the terminal device; an IP address of the terminal device; a UDP port used by the terminal device; a WAGF used by the terminal device; a line identifier of an access point used by the terminal device; and an HFC identifier of an access point used by the terminal device. For example, a locationFilterList attribute of an AmfEvent data structure may be reused in the request to indicate the at least one location reporting accuracy. Note that the at least one location reporting accuracy may be indicated in the request by any other suitable manner. As an exemplar example, the request may be an Namf_EventExposure_Subscribe request.

Figure 9:
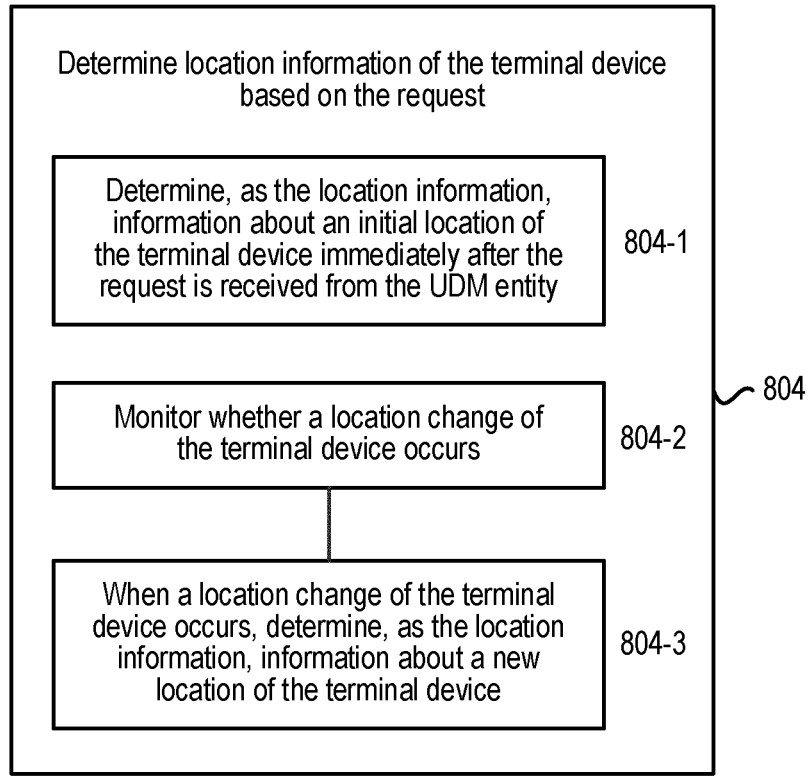
FIG. 9 is a flowchart for explaining the method of FIG. 8.

At block 804, the AMF entity determines location information of the terminal device based on the request. Since the at least one location reporting accuracy is indicated in the request for non-3GPP access of the terminal device through TNGF and/or WAGF, the location information of the terminal device may indicate any one or any combination of: a TNGF used by the terminal device; an IP address of the terminal device; a UDP port used by the terminal device; a WAGF used by the terminal device; a line identifier of an access point used by the terminal device; and an HFC identifier of an access point used by the terminal device. For example, block 804 may be implemented as block 804-1 or blocks 804-2~804-3 shown in FIG. 9. Block 804-1 may be performed if an immediate reporting is configured in the request. At block 804-1, the AMF entity determines, as the location information, information about an initial location of the terminal device immediately after the request is received from the UDM entity.

Blocks 804-2 and 804-3 are performed if a continuous reporting is configured in the request. At block 804-2, the AMF entity monitors whether a location change of the terminal device occurs. When a location change of the terminal device occurs, the AMF entity determines, as the location information, information about a new location of the terminal device at block 804-3. In a case that the terminal device accesses the network through TNGF or WAGF, since the access is made towards the AMF entity, the AMF entity knows which TNGF or WAGF is used by the terminal device and whether it has been changed. This also holds true for the corresponding IP address/UDP port or the corresponding line identifier/HFC identifier. Thus, the initial location or the new location can be determined at block 804-1 or blocks 804-2~804-3.

At block 806, the AMF entity reports the location information of the terminal device to an NEF entity. As an exemplary example, the location information of the terminal device is sent to the NEF entity in an Namf_EventExposure_Notify message. With the method of FIG. 8, the AMF entity can be enabled to support location reporting for a terminal device from possible non-3GPP accesses through TNGF and/or WAGF.

Figure 10:
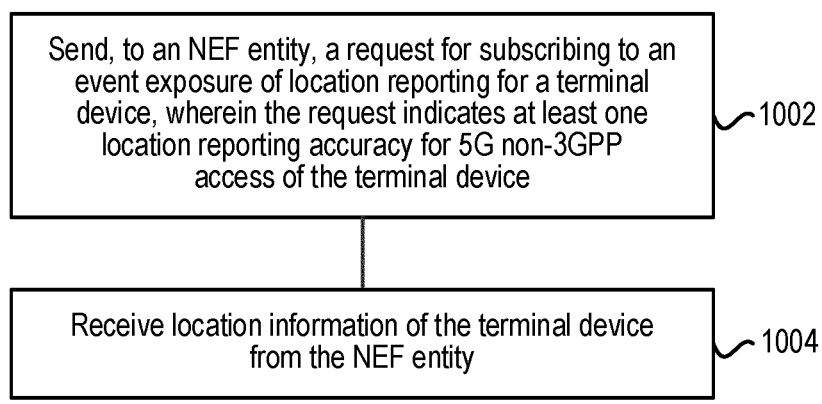
FIG. 10 is a flowchart illustrating a method implemented at an AF entity according to an embodiment of the disclosure.

FIG. 10 is a flowchart illustrating a method implemented at an AF entity according to an embodiment of the disclosure. At block 1002, the AF entity sends, to an NEF entity, a request for subscribing to an event exposure of location reporting for a terminal device. The request indicates at least one location reporting accuracy for 5G non-3GPP access of the terminal device. Block 1002 corresponds to block 602 and its details are omitted here. At block 1004, the AF entity receives location information of the terminal device from the NEF entity. Block 1004 corresponds to block 608 and its details are omitted here. With the method of FIG. 10, the AF entity can be enabled to support location reporting for a terminal device from possible 5G non-3GPP accesses.

Figure 11:
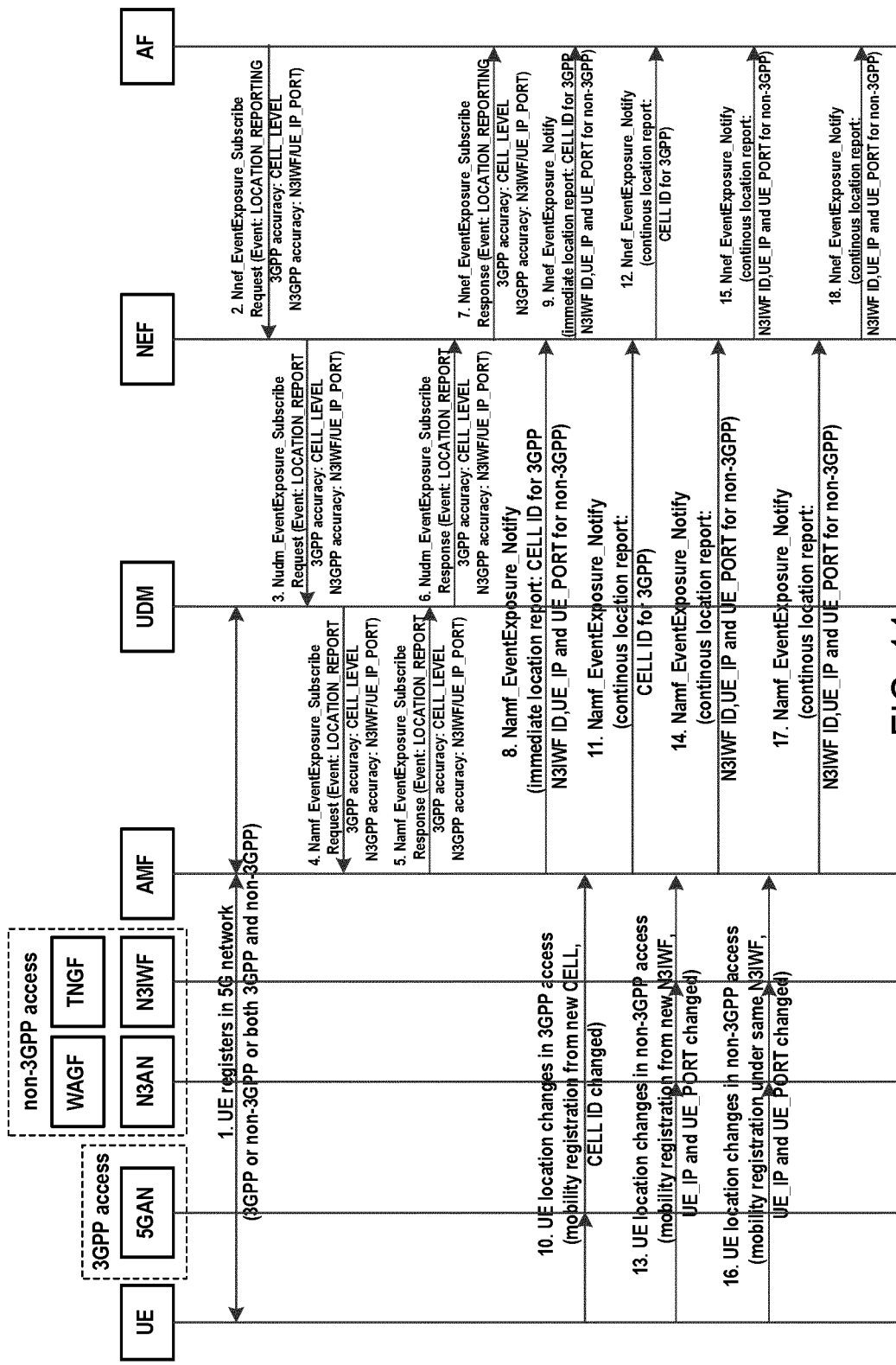
FIG. 11 is a flowchart illustrating an exemplary process according to an embodiment of the disclosure.

FIG. 11 is a flowchart illustrating an exemplary process according to an embodiment of the disclosure. As shown, this exemplary process involves location change event subscription/notification for 5G 3GPP access and untrusted 5G non-3GPP access. The term N3AN refers to non-3GPP access network. At step 1, the UE registers into the 5G core network. This may comprise that the UE is authenticated by the network and registered into the 5G core network (including the UDM). The UE may access the 5G network from different access networks: the 5G 3GPP access network based on new radio (NR) through the next generation node B (gNB) to the AMF, or the un-trusted 5G non-3GPP access network through the N3IWF to the AMF, or the trusted 5G non-3GPP access network through the TNGF to the AMF, or the wireline 5G non-3GPP access network through the W-AGF to the AMF.

At step 2, the AF subscribes location change event for the UE through the NEF exposed API operation Nnef_EventExposure_Subscribe request. In the request body, more information of the event subscription is provided such as below:

MonitoringType: LOCATION_REPORTING
Msisdn: xxxxxxxxxxx
notificationDestination: http://example.af.com/notif
accuracy(3GPP): CGI_ECGI
n3gppAccuracy: N3IWF, UE_IP, UE_PORT.

Here the event notification subscription example is for the AF which is interested in the location granularity including any of N3IWF, UE_IP, UE_PORT.

As mentioned above, it is still not possible for NEF to support such UE location change events. Thus, enhancements need to be added here for NEF to expose location change event for UEs from all possible 5G non-3GPP accesses. One example of the enhancements on the 3GPP protocols is shown as below with the added contents being underlined.

TABLE 1

Enumeration Accuracy (changes compared to Table 5.3.2.4.7-1 of 3GPP TS 29.122 V16.2.0 are underlined)

| Enumeration value | Description |
| --- | --- |
| CGI_ECGI | The SCS/AS requests to be notified at cell level location accuracy. |
| ENODEB | The SCS/AS requests to be notified at eNodeB level location accuracy. |
| TA_RA | The SCS/AS requests to be notified at TA/RA level location accuracy. |
| PLMN | The SCS/AS requests to be notified at PLMN level location accuracy. |
| TWAN_ID | The SCS/AS requests to be notified at TWAN identifier level location accuracy. |
| GEO_AREA | The SCS/AS requests to be notified of the geographical area accuracy. |
| N3IWF | The SCS/AS requests to be notified of N3IWF level location accuracy. |
| TNGF | The SCS/AS requests to be notified of TNGF level location accuracy. |
| UE_IP | The SCS/AS requests to be notified of UE IP level location accuracy. |
| UE_PORT | The SCS/AS requests to be notified of UE PORT level location accuracy. |
| WAGF | The SCS/AS requests to be notified of WAGF level location accuracy. |
| LINE_ID | The SCS/AS requests to be notified of LINE identifier level location accuracy. |
| HFC_ID | The SCS/AS requests to be notified of HFC identifier level location accuracy. |

As shown in the table above, N3IWF and TNGF granularity is added for un-trusted 5G non-3GPP access and trusted 5G non-3GPP access respectively. WAGF is added for wireline 5G non-3GPP access. In addition, UE_IP and UE_PORT is added for the IP connectivity level granularity for UE connected through un-trusted 5G non-3GPP access or trusted 5G non-3GPP access. For wireline 5G non-3GPP access, the line identifier (LINE_ID) or HFC identifier (HFC_ID) level granularity is added. The format of Line ID and HFC ID are defined in 3GPP TS 23.316 and excerpts are copied below for reference.

The format of the Line ID is generic, allowing different operators and access networks to use different encoding of the content. The Line ID can have the following formats:

- DHCPv4 option 82 exchange (TR-101 issue 2 [6] Annex B, original specification 2006);
- PPPoE Circuit and Remote ID AVP insertion (TR-101 issue 2 [6] Annex A/8.3, original specification 2006);
- DHCPv6 use of option 18 via LDRA functionality in the access node (BBF TR-177 Issue 1 Corrigendum 1 [12], original specification 2010);
- Use of the Line ID Option (LIO) in RS messaging (BBF TR-177 Issue 1 Corrigendum 1 [12], original specification 2010). Also documented in RFC 6788 [13], which differs slightly from the BBF encodings.

The format of the HFC Identifier is an octet string and may contain a cable modem MAC address or an overall HFC account identifier, as defined by CableLabs in DOCSIS MULPI[8].

In addition, to allow the configuration of multiple accuracy level on the subscribed location change event, the NEF data structure for the subscribed event is proposed to be updated. Table 2-1 and Table 2-2 show two alternatives of changes compared to Table 5.3.2.1.2-1 of 3GPP TS 29.122 V16.2.0.

TABLE 2-1

Definition of type MonitoringEventSubscription (changes compared Table 5.3.2.1.2-1 of 3GPP TS 29.122 V16.2.0 are underlined)

| Attribute name | Data type | Cardinality | Description |
| --- | --- | --- | --- |
| self | Link | 0 . . . 1 | Link to the resource"Individual Monitoring Event Subscription". This parameter shall be supplied by the SCEF in HTTP responses. |
| supportedFeatures | SupportedFeatures | 0 . . . 1 | Used to negotiate the supported optional features of the API as described in subclause 5.2.7. This attribute shall be provided in the POST request and in the response of successful resource creation. |
| mtcProviderId | string | 0 . . . 1 | Identifies the MTC Service Provider and/or MTC Application. (NOTE 7) |
| externalId | ExternalId | 0 . . . 1 | Identifies a user as defined in Clause 4.6.2 of 3GPP TS 23.682 [2]. (NOTE 1) |
| msisdn | Msisdn | 0 . . . 1 | Identifies the MS internal PSTN/ISDN number allocated for a UE. (NOTE 1) |
| externalGroupId | ExternalGroupId | 0 . . . 1 | Identifies a user group as defined in Clause 4.6.2 of 3GPP TS 23.682 [2]. (NOTE 1)(NOTE 6) |
| addExtGroupIds | array(ExternalGroupId) | 0 . . . N | Identifies user groups as defined in Clause 4.6.2 of 3GPP TS 23.682 [2]. (NOTE 1) (NOTE 6) |
| ipv4Addr | Ipv4Addr | 0 . . . 1 | Identifies the Ipv4 address. (NOTE 1) |
| ipv6Addr | Ipv6Addr | 0 . . . 1 | Identifies the Ipv6 address. (NOTE 1) |
| notificationDestination | Link | 1 | An URI of a notification destination that T8 message shall be delivered to. |
| requestTestNotification | boolean | 0 . . . 1 | Set to true by the SCS/AS to request the SCEF to send a test notification as defined in subclause 5.2.5.3. Set to false or omitted otherwise. |
| websockNotifConfig | WebsockNotifConfig | 0 . . . 1 | Configuration parameters to set up notification delivery over Websocket protocol as defined in subclause 5.2.5.4. |
| monitoringType | MonitoringType | 1 | Enumeration of monitoring type. Refer to clause 5.3.2.4.3. |
| maximumNumberOfReports | integer | 0 . . . 1 | Identifies the maximum number of event reports to be generated by the HSS, MME/SGSN as specified in subclause 5.6.0 of 3GPP TS 23.682 [2]. (NOTE 2) |
| monitorExpireTime | DateTime | 0 . . . 1 | Identifies the absolute time at which the related monitoring event request is considered to expire, as specified in subclause 5.6.0 of 3GPP TS 23.682 [2]. (NOTE 2) |
| groupReportGuardTime | DurationSec | 0 . . . 1 | Identifies the time for which the SCEF can aggregate the monitoring event reports detected by the UEs in a group and report them together to the SCS/AS, as specified in subclause 5.6.0 of 3GPP TS 23.682 [2]. |

TABLE 2-1-continued

Definition of type MonitoringEventSubscription (changes compared
Table 5.3.2.1.2-1 of 3GPP TS 29.122 V16.2.0 are underlined)

| | | | |
|---|---|---|---|
| maximumDetectionTime | DurationSec | 0 . . . 1 | If "monitoring-Type" is "LOSS_OF_CONNECTIVITY", this parameter may be included to identify the maximum period of time after which the UE is considered to be unreachable. |
| reachabilityType | ReachabilityType | 0 . . . 1 | If "monitoring-Type" is "UE_REACHABILITY", this parameter shall be included to identify whether the request is for "Reachability for SMS" or "Reachability for Data". |
| maximumLatency | DurationSec | 0 . . . 1 | If "monitoring-Type" is "UE_REACHABILITY", this parameter may be included to identify the maximum delay acceptable for downlink data transfers. |
| maximumResponseTime | DurationSec | 0 . . . 1 | If "monitoring-Type" is "UE_REACHABILITY", this parameter may be included to identify the length of time for which the UE stays reachable to allow the SCS/AS to reliably deliver the required downlink data. |
| suggestedNumberOfDlPackets | integer | 0 . . . 1 | If "monitoringType" is "UE_REACHABILITY", this parameter may be included to identify the number of packets that the serving gateway shall buffer in case that the UE is not reachable. |
| idleStatusIndication | boolean | 0 . . . 1 | If "monitoringType" is set to "UE_REACHABILITY" or "AVAILABILITY_AFTER_DDN_FAILURE", this parameter may be included to indicate the notification of when a UE, for which PSM is enabled, transitions into idle mode. "true": indicate enabling of notification "false": indicate no need to notify Default: "false". |
| locationType | LocationType | 0 . . . 1 | If "monitoringType" is "LOCATION_REPORTING" or "NUMBER_OF_UES_IN_AN_AREA", this parameter shall be included to identify whether the request is for Current Location or Last known Location. (NOTE 4) |
| accuracy | array(Accuracy) | 0 . . . N | If "monitoring-Type" is "LOCATION_REPORTING", this parameter may be included to identify the desired level of accuracy of the requested location information, as described in subclause 4.9.2 of 3GPP TS 23.682 [2]. |
| minimumReportInterval | DurationSec | 0 . . . 1 | If "monitoring-Type" is "LOCATION_REPORTING", this parameter may be included to identify a minimum time interval between Location Reporting notifications. |
| associationType | AssociationType | 0 . . . 1 | If "monitoring-Type" is "CHANGE_OF_IMSI_IMEI_ASSOCIATION", this parameter shall be included to identify whether the change of IMSI-IMEI or IMSI-IMEISV association shall be detected. |
| plmnIndication | boolean | 0 . . . 1 | If "monitoring-Type" is "ROAMING_STATUS", this parameter may be included to indicate the notification of UE's Serving PLMN ID. "true": The value shall be used to indicate enabling of notification; "false": The value shall be used to indicate disabling of notification. Default: "false". |
| locationArea | LocationArea | 0 . . . 1 | If "monitoring-Type" is "NUMBER_OF_UES_IN_AN_AREA", this parameter may be included to indicate the area within which the SCS/AS requests the number of UEs. |
| locationArea5G | LocationArea5G | 0 . . . 1 | If "monitoring-Type" is "NUMBER_OF_UES_IN_AN_AREA", this parameter may be included to indicate the area within which the AF requests the number of UEs. |

TABLE 2-1-continued

Definition of type MonitoringEventSubscription (changes compared Table 5.3.2.1.2-1 of 3GPP TS 29.122 V16.2.0 are underlined)

| | | | |
|---|---|---|---|
| dddTraDes | DddTrafficDescriptor | 0 . . . 1 | The traffic descriptor of the downlink data source. May be included for event "DOWNLINK_DATA_DELIVERY_STATUS" or "AVAILABILITY_AFTER_DDN_FAILURE". |
| dddStati | array(DddStatus) | 0 . . . N | May be included for event "DOWNLINK_DATA_DELIVERY_STATUS". The subscribed stati (delivered, transmitted, buffered) for the event. If omitted all stati are subscribed. |
| monitoringEventReport | MonitoringEventReport | 0 . . . 1 | Identifies a monitoring event report which is sent from the SCEF to the SCS/AS. |

| Attribute name | Applicability (NOTE 3) |
|---|---|
| self | |
| supportedFeatures | |
| mtcProviderId | |
| externalId | (NOTE 5) |
| msisdn | (NOTE 5) |
| externalGroupId | |
| addExtGroupIds | Number_of_UEs_in_an_area_notification, Number_of_UEs_in_an_area_notification_5G |
| ipv4Addr | Location_notification, Communication_failure_notification |
| ipv6Addr | Location_notification, Communication_failure_notification |
| notificationDestination | |
| requestTestNotification | Notification_test_event |
| websockNotifConfig | Notification_websocket |
| monitoringType | |
| maximumNumberOfReports | |
| monitorExpireTime | |
| groupReportGuardTime | |
| maximumDetectionTime | Loss_of_connectivity_notification |
| reachabilityType | Ue-reachability_notification |
| maximumLatency | Ue-reachability_notification |
| maximumResponseTime | Ue-reachability_notification |
| suggestedNumberOfDlPackets | Ue-reachability-notification |
| idleStatusIndication | Ue-reachability_notification, Availability_after_DDN_failure_notification, Availability_after_DDN_failure_notification_enhancement |
| locationType | Location_notification, Number_of_UEs_in_an_area_notification, Number_of_UEs_in_an_area_notification_5G |
| accuracy | Location_notification |
| minimumReportInterval | Location_notification |
| associationType | Change_of_IMSI_IMEI_association_notification |
| plmnIndication | Roaming_status_notification |
| locationArea | Number_of_UEs_in_an_area_notification |
| locationArea5G | Number_of_UEs_in_an_area_notification_5G |
| dddTraDes | Downlink_data_delivery_status_5G, Availability_after_DDN_failure_notification_enhancement |
| dddStati | Downlink_data_delivery_status_5G |
| monitoringEventReport | |

NOTE 1:
One of the properties "externalId", "msisdn", "ipv4Addr", "ipv6Addr" or "externalGroupId" shall be included for features "Location_notification" and "Communication_failure_notification";. "ipv4Addr" or "ipv6Addr" is required for monitoring via the PCRF for an individual UE. One of the properties "externalId", "msisdn" or "externalGroupId" shall be included for features "Pdn_connectivity_status", "Loss_of_connectivity_notification", "Ue-reachability_notification", "Change_of_IMSI_IMEI_association_notification", "Roaming_status_notification", "Availability_after_DDN_failure_notification" and "Availability_after_DDN_failure_notification_enhancement";;

NOTE 2:
Inclusion of either "maximumNumberOfReports" (with a value higher than 1) or "monitorExpireTime" makes the Monitoring Request a Continuous Monitoring Request, where the SCEF sends Notifications until either the maximum number of reports or the monitoring duration indicated by the property "monitorExpireTime" is exceeded. The "maximumNumberOfReports" with a value 1 makes the Monitoring Request a One-time Monitoring Request. At least one of "maximumNumberOfReports" or "monitorExpireTime" shall be provided.

NOTE 3:
Properties marked with a feature as defined in subclause 5.3.4 are applicable as described in subclause 5.2.7. If no features are indicated, the related property applies for all the features.

NOTE 4:
In this release, for features "Number_of_UEs_in_an_area_notification" and "Number_of_UEs_in_an_area_notification_5G", locationType shall be set to "LAST_KNOWN_LOCATION".

NOTE 5:
The property does not apply for the features "Number_of_UEs_in_an_area_notification" and "Number_of_UEs_in_an_area_notification_5G".

NOTE 6:
For the features "Number_of_UEs_in_an_area_notification" and "Number_of_UEs_in_an_area_notification_5G", the property "externalGroupId" may be included for single group and "addExtGroupIds" may be included for multiple groups but not both.

NOTE 7:
The SCEF should check received MTC provider identifier and then the SCEF may: override it with local configured value and send it to HSS; send it directly to the HSS; or 2 reject the monitoring configuration request.

TABLE 2-2

Definition of type MonitoringEventSubscription (changes compared
to Table 5.3.2.1.2-1 of 3GPP TS 29.122 V16.2.0 are underlined)

| Attribute name | Data type | Cardinality | Description |
| --- | --- | --- | --- |
| self | Link | 0 . . . 1 | Link to the resource "Individual Monitoring Event Subscription". This parameter shall be supplied by the SCEF in HTTP responses. |
| supportedFeatures | SupportedFeatures | 0 . . . 1 | Used to negotiate the supported optional features of the API as described in subclause 5.2.7. This attribute shall be provided in the POST request and in the response of successful resource creation. |
| mtcProviderId | string | 0 . . . 1 | Identifies the MTC Service Provider and/or MTC Application. (NOTE 7) |
| externalId | ExternalId | 0 . . . 1 | Identifies a user as defined in Clause 4.6.2 of 3GPP TS 23.682 [2]. (NOTE 1) |
| msisdn | Msisdn | 0 . . . 1 | Identifies the MS internal PSTN/ISDN number allocated for a UE. (NOTE 1) |
| externalGroupId | ExternalGroupId | 0 . . . 1 | Identifies a user group as defined in Clause 4.6.2 of 3GPP TS 23.682 [2]. (NOTE 1)(NOTE 6) |
| addExtGroupIds | array(ExternalGroupId) | 0 . . . N | Identifies user groups as defined in Clause 4.6.2 of 3GPP TS 23.682 [2]. (NOTE 1) (NOTE 6) |
| ipv4Addr | Ipv4Addr | 0 . . . 1 | Identifies the Ipv4 address. (NOTE 1) |
| ipv6Addr | Ipv6Addr | 0 . . . 1 | Identifies the Ipv6 address. (NOTE 1) |
| notificationDestination | Link | 1 | An URI of a notification destination that T8 message shall be delivered to. |
| requestTestNotification | boolean | 0 . . . 1 | Set to true by the SCS/AS to request the SCEF to send a test notification as defined in subclause 5.2.5.3. Set to false or omitted otherwise. |
| websockNotifConfig | WebsockNotifConfig | 0 . . . 1 | Configuration parameters to set up notification delivery over Websocket protocol as defined in subclause 5.2.5.4. |
| monitoringType | MonitoringType | 1 | Enumeration of monitoring type. Refer to clause 5.3.2.4.3. |
| maximumNumberOfReports | integer | 0 . . . 1 | Identifies the maximum number of event reports to be generated by the HSS, MME/SGSN as specified in subclause 5.6.0 of 3GPP TS 23.682 [2]. (NOTE 2) |
| monitorExpireTime | DateTime | 0 . . . 1 | Identifies the absolute time at which the related monitoring event request is considered to expire, as specified in subclause 5.6.0 of 3GPP TS 23.682 [2]. (NOTE 2) |
| groupReportGuardTime | DurationSec | 0 . . . 1 | Identifies the time for which the SCEF can aggregate the monitoring event reports detected by the UEs in a group and report them together to the SCS/AS, as specified in subclause 5.6.0 of 3GPP TS 23.682 [2]. |
| maximumDetectionTime | DurationSec | 0 . . . 1 | If "monitoring-Type" is "LOSS_OF_CONNECTIVITY", this parameter may be included to identify the maximum period of time after which the UE is considered to be unreachable. |
| reachabilityType | ReachabilityType | 0 . . . 1 | If "monitoring-Type" is "UE_REACHABILITY", this parameter shall be included to identify whether the request is for "Reachability for SMS" or "Reachability for Data". |
| maximumLatency | DurationSec | 0 . . . 1 | If "monitoring-Type" is "UE_REACHABILITY", this parameter may be included to identify the maximum delay acceptable for downlink data transfers. |
| maximumResponseTime | DurationSec | 0 . . . 1 | If "monitoring-Type" is "UE_REACHABILITY", this parameter may be included to identify the length of time for which the UE stays reachable to allow the SCS/AS to reliably deliver the required downlink data. |
| suggestedNumberOfDlPackets | integer | 0 . . . 1 | If "monitoringType" is "UE_REACHABILITY", this parameter may be included to identify the number of packets that the serving gateway shall buffer in case that the UE is not reachable. |

TABLE 2-2-continued

Definition of type MonitoringEventSubscription (changes compared
to Table 5.3.2.1.2-1 of 3GPP TS 29.122 V16.2.0 are underlined)

| | | | |
|---|---|---|---|
| idleStatusIndication | boolean | 0 . . . 1 | If "monitoringType" is set to "UE_REACHABILITY" or "AVAILABILITY_AFTER_DDN_FAILURE", this parameter may be included to indicate the notification of when a UE, for which PSM is enabled, transitions into idle mode. "true": indicate enabling of notification "false": indicate no need to notify Default: "false". |
| locationType | LocationType | 0 . . . 1 | If "monitoringType" is "LOCATION_REPORTING" or "NUMBER_OF_UES_IN_AN_AREA", this parameter shall be included to identify whether the request is for Current Location or Last known Location. (NOTE 4) |
| accuracy | Accuracy | 0 . . . 1 | If "monitoring-Type" is "LOCATION_REPORTING", this parameter may be included to identify the desired level of accuracy of the requested location information, as described in subclause 4.9.2 of 3GPP TS 23.682 [2]. |
| n3gppAccuracy | array(Accuracy) | 0 . . . N | If "monitoring-Type" is "LOCATION_REPORTING", this parameter may be included to identify the desired level of accuracy of the requested location information, as described in subclause 4.9.2 of 3GPP TS 23.682 [2]. |
| minimumReportInterval | DurationSec | 0 . . . 1 | If "monitoring-Type" is "LOCATION_REPORTING", this parameter may be included to identify a minimum time interval between Location Reporting notifications. |
| associationType | AssociationType | 0 . . . 1 | If "monitoring-Type" is "CHANGE_OF_IMSI_IMEI_ASSOCIATION", this parameter shall be included to identify whether the change of IMSI-IMEI or IMSI-IMEISV association shall be detected. |
| plmnIndication | boolean | 0 . . . 1 | If "monitoring-Type" is "ROAMING_STATUS", this parameter may be included to indicate the notification of UE's Serving PLMN ID. "true": The value shall be used to indicate enabling of notification; "false": The value shall be used to indicate disabling of notification. Default: "false". |
| locationArea | LocationArea | 0 . . . 1 | If "monitoring-Type" is "NUMBER_OF_UES_IN_AN_AREA", this parameter may be included to indicate the area within which the SCS/AS requests the number of UEs. |
| locationArea5G | LocationArea5G | 0 . . . 1 | If "monitoring-Type" is "NUMBER_OF_UES_IN_AN_AREA", this parameter may be included to indicate the area within which the AF requests the number of UEs. |
| dddTraDes | DddTrafficDescriptor | 0 . . . 1 | The traffic descriptor of the downlink data source. May be included for event "DOWNLINK_DATA_DELIVERY_STATUS" or "AVAILABILITY_AFTER_DDN_FAILURE". |
| dddStati | array(DddStatus) | 0 . . . N | May be included for event "DOWNLINK_DATA_DELIVERY_STATUS". The subscribed stati (delivered, transmitted, buffered) for the event. If omitted all stati are subscribed. |
| monitoringEventReport | MonitoringEventReport | 0 . . . 1 | Identifies a monitoring event report which is sent from the SCEF to the SCS/AS. |
| | Attribute name | Applicability (NOTE 3) | |
| | self supportedFeatures mtcProviderId externalId msisdn externalGroupId | (NOTE 5) (NOTE 5) | |

TABLE 2-2-continued

Definition of type MonitoringEventSubscription (changes compared to Table 5.3.2.1.2-1 of 3GPP TS 29.122 V16.2.0 are underlined)

| | | |
|---|---|---|
| | addExtGroupIds | Number_of_UEs_in_an_area_notification, Number_of_UEs_in_an_area_notification_5G |
| | ipv4Addr | Location_notification, Communication_failure_notification |
| | ipv6Addr | Location_notification, Communication_failure_notification |
| | notificationDestination | |
| | requestTestNotification | Notification_test_event |
| | websockNotifConfig | Notification_websocket |
| | monitoringType | |
| | maximumNumberOfReports | |
| | monitorExpireTime | |
| | groupReportGuardTime | |
| | maximumDetectionTime | Loss_of_connectivity_notification |
| | reachabilityType | Ue-reachability_notification |
| | maximumLatency | Ue-reachability_notification |
| | maximumResponseTime | Ue-reachability_notification |
| | suggestedNumberOfDlPackets | Ue-reachability-notification |
| | idleStatusIndication | Ue-reachability_notification, Availability_after_DDN_failure_notification, Availability_after_DDN_failure_notification_enhancement |
| | locationType | Location_notification, Number_of_UEs_in_an_area_notification, Number_of_UEs_in_an_area_notification_5G |
| | accuracy | Location_notification |
| | n3gppAccuracy | Location_notification |
| | minimumReportInterval | Location_notification |
| | associationType | Change_of_IMSI_IMEI_association_notification |
| | plmnIndication | Roaming_status_notification |
| | locationArea | Number_of_UEs_in_an_area_notification |
| | locationArea5G | Number_of_UEs_in_an_area_notification_5G |
| | dddTraDes | Downlink_data_delivery_status_5G, Availability_after_DDN_failure_notification_enhancement |
| | dddStati | Downlink_data_delivery_status_5G |
| | monitoringEventReport | |

NOTE 1:
One of the properties "externalId", "msisdn", "ipv4Addr", "ipv6Addr" or "externalGroupId" shall be included for features "Location_notification" and "Communication_failure_notification";. "ipv4Addr" or "ipv6Addr" is required for monitoring via the PCRF for an individual UE. One of the properties "externalId", "msisdn" or "externalGroupId" shall be included for features "Pdn_connectivity_status", "Loss_of_connectivity_notification", "Ue-reachability_notification", "Change_of_IMSI_IMEI_association_notification", "Roaming_status_notification", "Availability_after_DDN_failure_notification" and "Availability_after_DDN_failure_notification_enhancement";;
NOTE 2:
Inclusion of either "maximumNumberOfReports" (with a value higher than 1) or "monitorExpireTime" makes the Monitoring Request a Continuous Monitoring Request, where the SCEF sends Notifications until either the maximum number of reports or the monitoring duration indicated by the property "monitorExpireTime" is exceeded. The "maximumNumberOfReports" with a value 1 makes the Monitoring Request a One-time Monitoring Request. At least one of "maximumNumberOfReports" or "monitorExpireTime" shall be provided.
NOTE 3:
Properties marked with a feature as defined in subclause 5.3.4 are applicable as described in subclause 5.2.7. If no features are indicated, the related property applies for all the features.
NOTE 4:
In this release, for features "Number_of_UEs_in_an_area_notification" and "Number_of_UEs_in_an_area_notification_5G", locationType shall be set to "LAST_KNOWN_LOCATION".
NOTE 5:
The property does not apply for the features "Number_of_UEs_in_an_area_notification" and "Number_of_UEs_in_an_area_notification_5G".
NOTE 6:
For the features "Number_of_UEs_in_an_area_notification" and "Number_of_UEs_in_an_area_notification_5G", the property "externalGroupId" may be included for single group and "addExtGroupIds" may be included for multiple groups but not both.
NOTE 7:
The SCEF should check received MTC provider identifier and then the SCEF may: override it with local configured value and send it to HSS; send it directly to the HSS; or reject the monitoring configuration request.

At step 3, the NEF subscribes the UE location change event notification from the UDM through the API operation Nudm_EventExposure_Subscribe request. More information is contained in the request uniform resource locator (URL) or in the request body as below:
  ueIdentity: msisdn-xxxxxxxxxxx
  referenceId: nef01-0001
  callbackReference: http://example.nef01.com/notif
  EventType: LOCATION_REPORT
  accuracy(3GPP): CELL_LEVEL
  n3gppAccuracy: N3IWF, UE_IP, UE_PORT
The UDM can make the identity translation to translation the mobile subscriber international ISDN number (MSISDN) into subscription permanent identifier (SUPI) identity, so internally SUPI can be used to correlate this UE location change event. The term ISDN refers to integrated services digital network.

Follow the previous example, the event notification subscription is for the NEF which is interested in the location granularity including any of N3IWF, UE_IP, UE_PORT. As mentioned above, it is still not possible for UDM to support such UE location change events. Enhancements need to be added here for UDM to expose location change event for UEs from all possible 5G non-3GPP accesses. One example of the enhancements on the 3GPP protocols is shown as below with the added contents being underlined.

TABLE 3

Enumeration LocationAccuracy (changes compared to Table 6.4.6.3.4-1 of 3GPP TS 29.503 V16.0.0 are underlined)

| Enumeration value | Description |
| --- | --- |
| "CELL_LEVEL" | change of cell shall be reported |
| "TA_LEVEL" | change of TA shall be reported |
| "N3IWF_LEVEL" | Change of N3IWFnode shall be reported for non-3GPP access |
| "TNGF_LEVEL" | Change of TNGF node shall be reported for non-3GPP access |
| "UE_IP" | change ofUE IP address (used to reach the N3IWF)shall be reported |
| "UE_PORT" | Change of UE source port shall be reported |
| "WAGF_LEVEL" | Change of WAGF node shall be reported for non-3GPP access |
| "LINE_ID" | Change of line identifier of the access point shall be reported |
| "HFC_ID" | Change of HFC identifier of the access point shall be reported |

In addition, to allow the configuration of multiple accuracy level on the subscribed location change event, the UDM data structure for the subscribed event is proposed to be updated. Table 4-1 and Table 4-2 show two alternatives of changes compared to Table 6.4.6.2.10-1 of 3GPP TS 29.503 V16.0.0.

TABLE 4-1

Definition of type LocationReportingConfiguration (changes compared to Table 6.4.6.2.10-1 of 3GPP TS 29.503 V16.0.0 are underlined)

| Attribute name | Data type | P | Cardinality | Description |
| --- | --- | --- | --- | --- |
| currentLocation | boolean | M | 1 | When true: Indicates that current location is requested. When false: Indicates that last known location is requested. |
| oneTime | boolean | C | 0 . . . 1 | When true: Indicates that a single report is requested. When false or absent: Indicates that continuous reporting is requested. Shall not be absent or set to false when currentLocation is false. |
| accuracy | array(LocationAccuracy) | C | 0 . . . N | Indicates whether Cell-level or TA-level accuracy is requested for 3GPP access. Indicates whether N3IWF id or UE local IP and optionally source port number is requested for untrusted non-3GPP access. Indicates whether TNGF id or UE local IP and optionally source port number is requested for trusted non-3GPP access. Indicates whether WAGF id or line identifier or HFC identifier is requested for wirelinenon-3GPP access. Shall be present if continuous reporting is requested |

TABLE 4-2

Definition of type LocationReportingConfiguration (changes compared to Table 6.4.6.2.10-1 of 3GPP TS 29.503 V16.0.0 are underlined)

| Attribute name | Data type | P | Cardinality | Description |
| --- | --- | --- | --- | --- |
| currentLocation | boolean | M | 1 | When true: Indicates that current location is requested. When false: Indicates that last known location is requested. |
| oneTime | boolean | C | 0 . . . 1 | When true: Indicates that a single report is requested. When false or absent: Indicates that continuous reporting is requested. Shall not be absent or set to false when currentLocation is false. |
| accuracy | LocationAccuracy | C | 0 . . . 1 | Indicates whether Cell-level or TA-level accuracy is requested for 3GPP access. Shall be present if continuous reporting is requested |
| n3gppAccuracy | LocationAccuracy | C | 0 . . . N | Indicates whether N3IWF id or UE local IP and optionally source port number is requested for untrusted non-3GPP access. Indicates whether TNGF id or UE local IP and optionally source port number is requested for trusted non-3GPP access. |

TABLE 4-2-continued

Definition of type LocationReportingConfiguration (changes compared to Table 6.4.6.2.10-1 of 3GPP TS 29.503 V16.0.0 are underlined)

| Attribute name | Data type | P | Cardinality | Description |
| --- | --- | --- | --- | --- |
| | | | | Indicates whether WAGF id or line identifier or HFC identifier is requested for wireline non-3GPP access<br>Shall be present if continuous reporting is requested |

At step 4, the UDM subscribes the UE location change event notification through API operation Namf_EventExposure_Subscribe request. More information is contained in the request body as below:
  eventNotifyUri: http://example.nef01.com/notif
  notifyCorrelationId: nef01-0001
  subsChangeNotifyUri: http://example.udm.com/notif
  subsChangeNotifyCorrelationId: udm01-0001
  AmfEventType: LOCATION_REPORT
  supi: imsi-xxxxxxxxxx
  locationFilterList:
    3GPP: CELL ID,
    Non-3GPP: N3IWF, UE_IP, UDP PORT Although the current protocol could support event notification subscription for UDM which is interested in untrusted 5G non-3GPP access, it is still not possible for AMF to support UE location change events for trusted 5G non-3GPP access and for wireline 5G non-3GPP access, as mentioned above. Enhancements need to be added here for AMF to expose location change event for UEs from all possible 5G non-3GPP accesses. One example of the enhancements on the 3GPP protocols is shown as below with the added contents being underlined.

TABLE 5

Enumeration LocationFilter (changes compared to Table 6.2.6.3.5-1 of 3GPP TS 29.518 V16.0.0 are underlined)

| Enumeration value | Description |
| --- | --- |
| "TAI" | Indicates any change of the TA used by the UE should be reported |
| "CELL_ID" | Indicates any change of the Cell used by the UE should be reported |
| "N3IWF" | Indicates any change of the N3IWF node used by the UE should be reported |
| "TNGF" | Indicates any change of the TNGF node used by the UE should be reported |
| "UE_IP" | Indicates any change of the UE local IP address should be reported |
| "UDP_PORT" | Indicates any change of local UDP port used by the UE reported |
| "WAGF" | Indicates any change of the WAGF node used by the UE should be reported |
| "LINE_ID" | Indicates any change of the line identifier should be reported |
| "HFC_ID" | Indicates any change of the HFC identifier should be reported |

In addition, for the final AMF event report, the current AMF protocol needs to be extended to support reporting of the UE location from trusted 5G non-3GPP access and wireline 5G non-3GPP access as shown in Table 6 below.

TABLE 6

Definition of type N3gaLocation (changes compared to Table 5.4.4.10-1 of 3GPP TS 29.571 V16.0.0 are underlined)

| Attribute name | Data type | P | Cardinality | Description |
|---|---|---|---|---|
| n3gppTai | Tai | C | 0 . . . 1 | The unique non 3GPP TAI used in the PLMN. It shall be present over the 3GPP PLMN internal interfaces, but shall not be present over the N5 interface. |
| n3IwfId | string | C | 0 . . . 1 | This IE shall contain the N3IWF identifierreceived over NGAP and shall be encoded as a string of hexadecimal characters. Pattern: '^[A-Fa-f0-9]+$' It shall be present over the 3GPP PLMN internal interfaces, but shall not be present over the N5 interface. |
| tngfId | string | C | 0 . . . 1 | This IE shall contain the TNGF identifierreceived over NGAP and shall be encoded as a string of hexadecimal characters. Pattern: ' [A-Fa-f0-9]+$' It shall be present over the 3GPP PLMN internal interfaces, but shall not be present over the N5 interface. |
| wagfId | string | C | 0 . . . 1 | This IE shall contain the W-AGF identifierreceived over NGAP and shall be encoded as a string of hexadecimal characters. Pattern: ' [A-Fa-f0-9]+$' It shall be present over the 3GPP PLMN internal interfaces, but shall not be present over the N5 interface. |
| ueIpv4Addr | Ipv4Addr | C | 0 . . . 1 | UE local IPv4 address (used to reach the N3IWF/TNGF). The ueIPv4Addr or the ueIPv6Addr shall be present. |
| ueIpv6Addr | Ipv6Addr | C | 0 . . . 1 | UE local Ipv6 address (used to reach the N3IWF/TNGF). The ueIPv4Addr or the ueIPv6Addr shall be present. |
| portNumber | Uinteger | C | 0 . . . 1 | UDP or TCP source port number. It shall be present if NAT is detected. |
| lineId | string | C | 0 . . . 1 | Line identifier of the access point |
| hfcId | string | C | 0 . . . 1 | HFC identifier of the access point |

At step 5, the AMF sends the Namf_EventExposure_Subscribe response to the UDM for the UE location change event notification subscription. At step 6, the UDM sends the Nudm_EventExposure_Subscribe response to the NEF for the UE location change event notification subscription. At step 7, the NEF sends the Nnef_EventExposure_Subscribe response to the AF for the UE location change event notification subscription.

For the immediate location report (which may be called Case #1), at step 8, if immediate report was requested in the previous UE location change event notification subscription (step 2-7), depending on the access network to which the UE is attached, the AMF could report the current location to the NEF immediately after step 5, for example:

Current CELL ID for 5G 3GPP access
N3IWF, UE_IP and UE_PORT for un-trusted 5G non-3GPP access.

At step 9, if immediate report was requested in the previous UE location change event notification subscription (step 2-7), depending on the access network to which the UE is attached, once having received the AMF report, the NEF could report the current location to the AF, for example:

Current CELL ID for 5G 3GPP access
N3IWF, UE_IP and UE_PORT for un-trusted 5G non-3GPP access.

For UE location change in 3GPP access (which may be called Case #2), at step 10, suppose the UE location changes in 3GPP access. For example, due to mobility into a new cell and registration from a new cell, the cell id has been changed. At step 11, the AMF, based on previous event subscription configuration, notifies the NEF in the continuous event report for the UE location change event as below:

New CELL ID in 5G 3GPP access.

At step 12, once having received the event report from the AMF, the NEF could report the current UE location to the AF as below:

New CELL ID in 5G 3GPP access.

For UE location change in un-trusted 5G non-3GPP access with N3IWF node change (which may be called Case #3), at step 13, suppose the UE location changes in un-trusted 5G non-3GPP access. For example, due to mobility into another area and registration from a new N3IWF, UE_IP and UE Port are also changed. At step 14, the AMF, based on previous event subscription configuration, notifies the NEF in the continuous event report for the UE location change event as below:

New N3IWF ID, new UE_IP, new UE Port for un-trusted 5G non-3GPP access.

At step 15, once having received the event report from AMF, the NEF could report the current UE location to the AF as below:

New N3IWF ID, new UE_IP, new UE Port for un-trusted 5G non-3GPP access.

For UE location change in un-trusted 5G non-3GPP access with the same N3IWF Id, but UE_IP and UE_PORT being changed (which may be called Case #4), at step 16, suppose the UE location changes in un-trusted 5G non- 3GPP access. For example, due to mobility into another attach point but still under the same N3IWF, UE_IP and UP PORT are reallocated. At step 17, the AMF, based on previous event subscription configuration, notifies the NEF in the continuous event report for the UE location change event as below:

N3IWF ID with changed UE_IP and UE_PORT for un-trusted 5G non-3GPP access.

At step 18, once having received the event report from the AMF, the NEF could report the current UE location to the AF as below:

N3IWF ID with changed UE_IP and UE_PORT for un-trusted 5G non-3GPP access.

Figure 12:
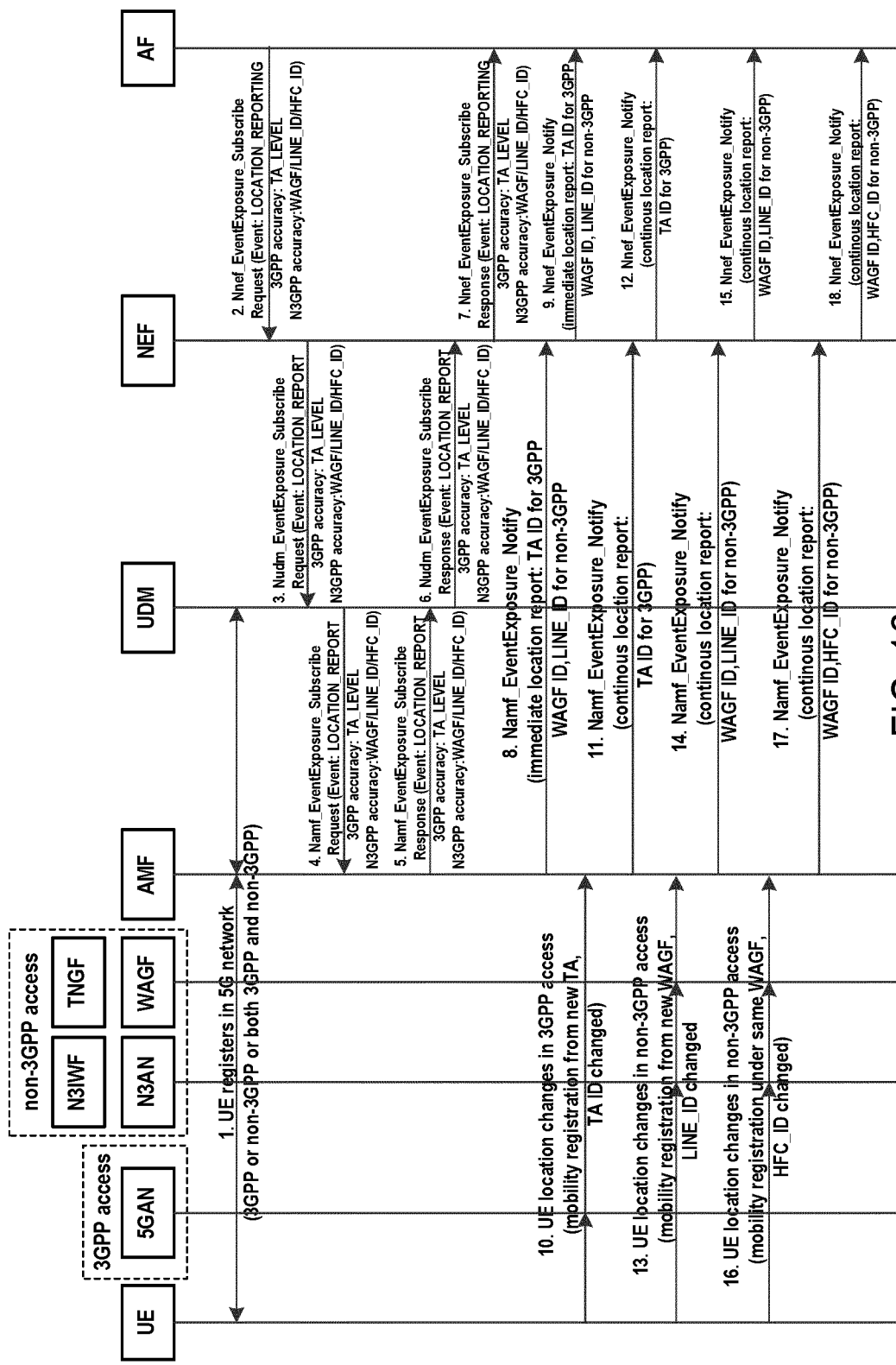
FIG. 12 is a flowchart illustrating another exemplary process according to an embodiment of the disclosure.

FIG. 12 is a flowchart illustrating another exemplary process according to an embodiment of the disclosure. As shown, this exemplary process involves UE location change event subscription/notification for 5G 3GPP access and wireline 5G non-3GPP access. Based on the previously proposed enhancements, now more and more cases could be supported, for example, to support UE location change report:

3GPP accuracy: TA_LEVEL
Non-3GPP accuracy: WAGF_ID, LINE_ID, HFC_ID.

Step 1 is the same as step 1 in FIG. 11 for UE to register into the 5G core network. Steps 2-7 are similar as steps 2-7 of FIG. 11 and the only difference is on the interested UE location granularity:

3GPP accuracy: TA_LEVEL (tracking area level)
Non-3GPP accuracy: WAGF_ID, LINE_ID, HFC_ID.

For Case #1 (immediate location report), steps 8-9 are similar as steps 8-9 in FIG. 11, but this time is for immediate report of UE location:

TA ID for the 3GPP access
WAGF ID, LINE ID or HFC ID for the non-3GPP access.

For Case #2 (UE location change in 5G 3GPP access (TA ID changed)), steps 10-12 are similar as steps 10-12 in FIG. 11, but the UE location change is for UE mobility and registration from a new TA. So new TA ID in 3GPP access is reported.

For Case #3 (UE location change in 5G non-3GPP access (WAGF ID and LINE_ID changed)), steps 13-15 are similar as steps 13-15 in FIG. 11, but the UE location change is for UE mobility and attached from new LINE_ID and registration from new WAGF. So new WAGF_ID and new LINE_ID for 5G wireline non-3GPP access are reported.

For Case #4 (UE location change in non-3GPP access under the same WAGF, but attached from a new HFC_ID), steps 16-18 are similar as steps 16-18 in FIG. 11, but UE location change is for the UE mobility and attached from new HFC_ID but under the same WAGF. So the same WAGF and new HFC_ID for 5G wireline non-3GPP access are reported. With the processes shown in FIGS. 11 and 12, location change events can be supported from end to end for UEs from all possible 5G non-3GPP accesses. It should be noted that two blocks shown in succession in the figures may, in fact, be executed substantially concurrently, or the blocks may sometimes be executed in the reverse order, depending upon the functionality involved.

Figure 13:
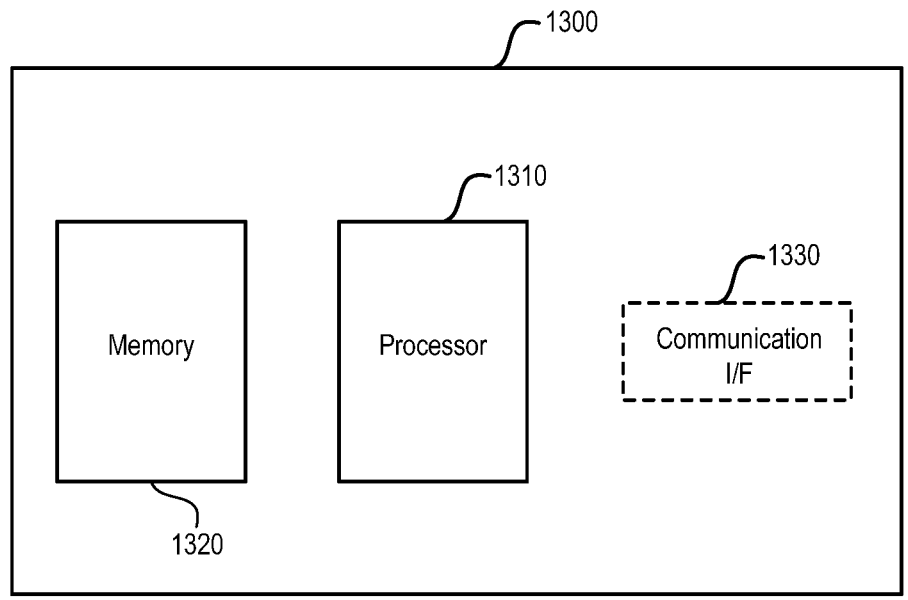
FIG. 13 is a block diagram showing an apparatus suitable for use in practicing some embodiments of the disclosure.

FIG. 13 is a block diagram showing an apparatus suitable for use in practicing some embodiments of the disclosure. For example, any one of the NEF entity, the UDM entity, the AMF entity and the AF entity described above may be implemented through the apparatus 1300. As shown, the apparatus 1300 may include a processor 1310, a memory 1320 that stores a program, and optionally a communication interface 1330 for communicating data with other external devices through wired and/or wireless communication.

The program includes program instructions that, when executed by the processor 1310, enable the apparatus 1300 to operate in accordance with the embodiments of the present disclosure, as discussed above. That is, the embodiments of the present disclosure may be implemented at least in part by computer software executable by the processor 1310, or by hardware, or by a combination of software and hardware.

The memory 1320 may be of any type suitable to the local technical environment and may be implemented using any suitable data storage technology, such as semiconductor based memory devices, flash memories, magnetic memory devices and systems, optical memory devices and systems, fixed memories and removable memories. The processor 1310 may be of any type suitable to the local technical environment, and may include one or more of general purpose computers, special purpose computers, microprocessors, digital signal processors (DSPs) and processors based on multi-core processor architectures, as non-limiting examples.

Figure 14:
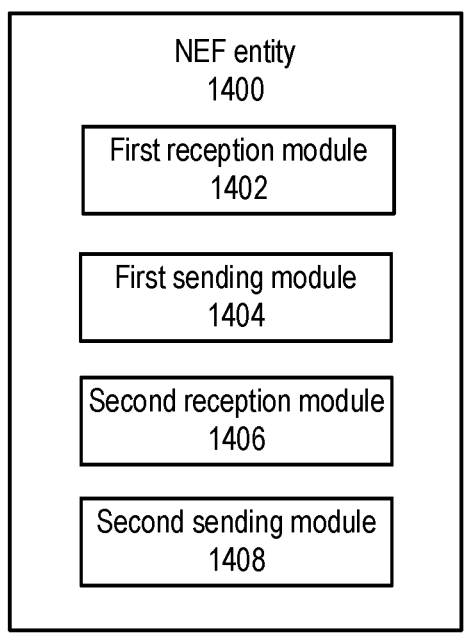
FIG. 14 is a block diagram showing an NEF entity according to an embodiment of the disclosure.

FIG. 14 is a block diagram showing an NEF entity according to an embodiment of the disclosure. As shown, the NEF entity 1400 comprises a first reception module 1402, a first sending module 1404, a second reception module 1406 and a second sending module 1408. The first reception module 1402 may be configured to receive, from an AF entity, a first request for subscribing to an event exposure of location reporting for a terminal device, as described above with respect to block 602. The first request indicates at least one location reporting accuracy for 5G non-3GPP access of the terminal device. The first sending module 1404 may be configured to send, to a UDM entity, a second request for subscribing to an event exposure of location reporting for the terminal device, as described above with respect to block 604. The second request indicates the at least one location reporting accuracy. The second reception module 1406 may be configured to receive, from an AMF entity, location information of the terminal device, as described above with respect to block 606. The second sending module 1408 may be configured to send the location information of the terminal device to the AF entity, as described above with respect to block 608.

Figure 15:
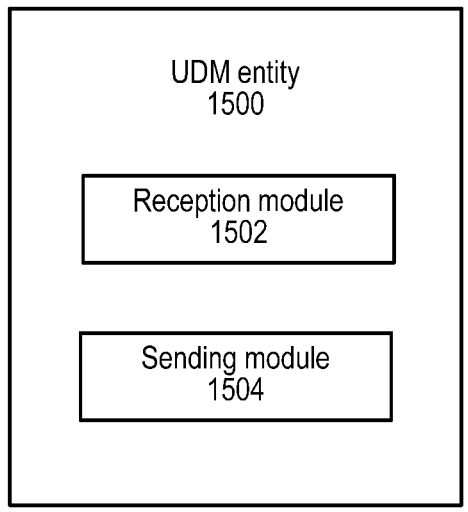
FIG. 15 is a block diagram showing a UDM entity according to an embodiment of the disclosure.

FIG. 15 is a block diagram showing a UDM entity according to an embodiment of the disclosure. As shown, the UDM entity 1500 comprises a reception module 1502 and a sending module 1504. The reception module 1502 may be configured to receive, from an NEF entity, a first request for subscribing to an event exposure of location reporting for a terminal device, as described above with respect to block 702. The first request indicates at least one location reporting accuracy for non-3GPP access of the terminal device. The sending module 1504 may be configured to send, to an AMF entity, a second request for subscribing to an event exposure of location reporting for the terminal device, as described above with respect to block 704. The second request indicates the at least one location reporting accuracy.

Figure 16:
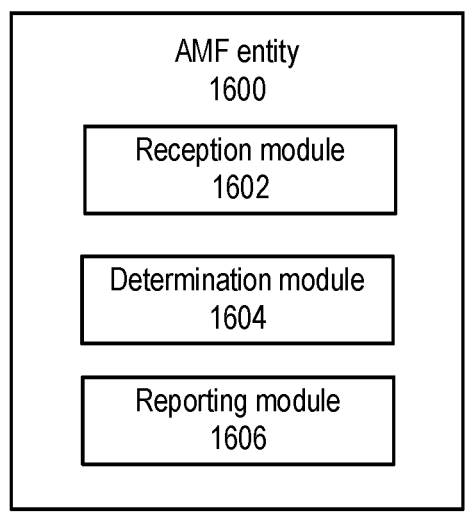
FIG. 16 is a block diagram showing an AMF entity according to an embodiment of the disclosure.

FIG. 16 is a block diagram showing an AMF entity according to an embodiment of the disclosure. As shown, the AMF entity 1600 comprises a reception module 1602, a determination module 1604 and a reporting module 1606. The reception module 1602 may be configured to receive, from a UDM entity, a request for subscribing to an event exposure of location reporting for a terminal device, as described above with respect to block 802. The request indicates at least one location reporting accuracy for non-3GPP access of the terminal device through TNGF and/or WAGF. The determination module 1604 may be configured to determine location information of the terminal device based on the request, as described above with respect to block 804. The reporting module 1606 may be configured to report the location information of the terminal device to an NEF entity, as described above with respect to block 806.

Figure 17:
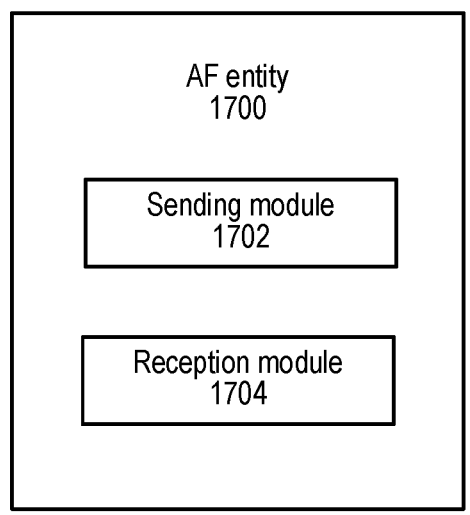
FIG. 17 is a block diagram showing an AF entity according to an embodiment of the disclosure.

FIG. 17 is a block diagram showing an AF entity according to an embodiment of the disclosure. As shown, the AF entity 1700 comprises a sending module 1702 and a reception module 1704. The sending module 1702 may be configured to send, to an NEF entity, a request for subscribing to an event exposure of location reporting for a terminal device, as described above with respect to block 1002. The request indicates at least one location reporting accuracy for 5G non-3GPP access of the terminal device. The reception module 1704 may be configured to receive location information of the terminal device from the NEF entity, as described above with respect to block 1004. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a network exposure function (NEF) entity, comprising:
   receiving, from an application function (AF) entity, a first request for subscribing to an event exposure of location reporting for a terminal device, wherein the first request indicates at least one location reporting accuracy for 5th generation (5G) non-3rd generation partnership project (non-3GPP) access of the terminal device, wherein a non-3GPP accuracy (n3gppAccuracy) attribute is used in the first request to indicate the at least one location reporting accuracy;
   sending, to a unified data management (UDM) entity, a second request for subscribing to an event exposure of location reporting for the terminal device, wherein the second request indicates the at least one location reporting accuracy, wherein an n3gppAccuracy attribute is used in the second request to indicate the at least one location reporting accuracy;
   receiving, from an access and mobility management function (AMF) entity, location information of the terminal device; and
   sending the location information of the terminal device to the AF entity.

2. The method according to claim 1, wherein the at least one location reporting accuracy comprises one or more of:
- a non-3GPP interworking function (N3IWF) information, which indicates that a change of N3IWF node used by the terminal device should be reported;
- a trusted non-3GPP gateway function (TNGF) used by the terminal device;
- an Internet protocol (IP) address information which indicates that a change of IP of the terminal device should be reported;
- a user datagram protocol (UDP) port used by the terminal device;
- a wireline access gateway function (WAGF) used by the terminal device;
- a line identifier of an access point used by the terminal device; and
- a hybrid fiber-coaxial (HFC) identifier of an access point used by the terminal device.

3. The method according to claim 1, wherein a list of Accuracy attribute taking a form of an array is used in the second request to indicate the at least one location reporting accuracy.

4. The method according claim 1, wherein the location information of the terminal device indicates one or more of:
- an N3IWF used by the terminal device;
- a TNGF used by the terminal device;
- an IP address of the terminal device;
- a UDP port used by the terminal device;
- a WAGF used by the terminal device;
- a line identifier of an access point used by the terminal device; and
- an HFC identifier of an access point used by the terminal device.

5. The method according to claim 1, wherein the location information of the terminal device indicates one of:
- an initial location of the terminal device immediately after the second request is sent to the UDM entity; and
- a new location of the terminal device when a location change of the terminal device occurs.

6. A method performed by a unified data management (UDM) entity, comprising:
- receiving, from a network exposure function (NEF) entity, a first request for subscribing to an event exposure of location reporting for a terminal device, wherein the first request indicates at least one location reporting accuracy for fifth generation (5G) non-3rd generation partnership project (non-3GPP) access of the terminal device, wherein a non-3GPP accuracy (n3gppAccuracy) attribute is used in the first request to indicate the at least one location reporting accuracy; and
- sending, to an access and mobility management function (AMF) entity, a second request for subscribing to an event exposure of location reporting for the terminal device, wherein the second request indicates the at least one location reporting accuracy.

7. The method according to claim 6, wherein the at least one location reporting accuracy comprises one or more of:
- a non-3GPP interworking function (N3IWF) information, which indicates that a change of N3IWF node used by the terminal device should be reported;
- a trusted non-3GPP gateway function (TNGF) used by the terminal device;
- an Internet protocol (IP) address information which indicates that a change of IP of the terminal device should be reported;
- a user datagram protocol (UDP) port used by the terminal device;
- a wireline access gateway function (WAGF) used by the terminal device;
- a line identifier of an access point used by the terminal device; and
- a hybrid fiber-coaxial (HFC) identifier of an access point used by the terminal device.

8. The method according to claim 6, wherein a locationFilterList attribute of an AmfEvent data structure is used in the second request to indicate the at least one location reporting accuracy.

9. A method performed by an application function (AF) entity, comprising:
- sending, to a network exposure function (NEF) entity, a request for subscribing to an event exposure of location reporting for a terminal device, wherein the request indicates at least one location reporting accuracy for 5th generation (5G) non-3rd generation partnership project (non-3GPP) access of the terminal device, wherein a non-3GPP accuracy (n3gppAccuracy) attribute is used in the request to indicate the at least one location reporting accuracy; and
- receiving location information of the terminal device from the NEF entity.

10. The method according to claim 9, wherein the at least one location reporting accuracy comprises one or more of:
- a non-3GPP interworking function (N3IWF) used by the terminal device;
- a trusted non-3GPP gateway function (TNGF) used by the terminal device;
- an Internet protocol (IP) address of the terminal device;
- a user datagram protocol (UDP) port used by the terminal device;
- a wireline access gateway function (WAGF) used by the terminal device;
- a line identifier of an access point used by the terminal device; and
- a hybrid fiber-coaxial (HFC) identifier of an access point used by the terminal device.

11. The method according to claim 9, wherein the location information of the terminal device indicates one or more of:
- an N3IWF used by the terminal device;
- a TNGF used by the terminal device;
- an IP address of the terminal device;
- a UDP port used by the terminal device;
- a WAGF used by the terminal device;
- a line identifier of an access point used by the terminal device; and
- an HFC identifier of an access point used by the terminal device.

12. The method according to claim 9, wherein the location information of the terminal device indicates one of:
- an initial location of the terminal device immediately after the request is sent to the NEF entity; and
- a new location of the terminal device when a location change of the terminal device occurs.

13. A network exposure function (NEF) entity comprising:
- at least one processor; and
- at least one memory, the at least one memory containing instructions executable by the at least one processor, whereby the NEF entity is operative to:
  - receive, from an application function (AF) entity, a first request for subscribing to an event exposure of location reporting for a terminal device, wherein the first request indicates at least one location reporting accuracy for 5th generation (5G) non-3rd generation partnership project (non-3GPP) access of the terminal device, wherein an n3gppAccuracy attribute is used in the first request to indicate the at least one location reporting accuracy;

send, to a unified data management (UDM) entity, a second request for subscribing to an event exposure of location reporting for the terminal device, wherein the second request indicates the at least one location reporting accuracy, wherein an n3gppAccuracy attribute is used in the second request to indicate the at least one location reporting accuracy;

receive, from an access and mobility management function (AMF) entity, location information of the terminal device; and send the location information of the terminal device to the AF entity.

14. The network exposure function according to claim 13, wherein the at least one location reporting accuracy comprises one or more of:
- a non-3GPP interworking function (N3IWF) information, which indicates that a change of N3IWF node used by the terminal device should be reported;
- a trusted non-3GPP gateway function (TNGF) used by the terminal device;
- an Internet protocol (IP) address information which indicates that a change of IP of the terminal device should be reported;
- a user datagram protocol (UDP) port used by the terminal device;
- a wireline access gateway function (WAGF) used by the terminal device;
- a line identifier of an access point used by the terminal device; and
- a hybrid fiber-coaxial (HFC) identifier of an access point used by the terminal device.

15. The network exposure function according to claim 13, wherein a list of Accuracy attribute taking a form of an array is used in the second request to indicate the at least one location reporting accuracy.

16. The network exposure function according claim 13, wherein the location information of the terminal device indicates one or more of:
- an N3IWF used by the terminal device;
- a TNGF used by the terminal device;
- an IP address of the terminal device;
- a UDP port used by the terminal device;
- a WAGF used by the terminal device;
- a line identifier of an access point used by the terminal device; and
- an HFC identifier of an access point used by the terminal device.

17. The network exposure function according to claim 13, wherein the location information of the terminal device indicates one of:
- an initial location of the terminal device immediately after the second request is sent to the UDM entity; and
- a new location of the terminal device when a location change of the terminal device occurs.

18. A unified data management (UDM) entity comprising:
at least one processor; and
at least one memory, the at least one memory containing instructions executable by the at least one processor, whereby the UDM entity is operative to:
receive, from a network exposure function (NEF) entity, a first request for subscribing to an event exposure of location reporting for a terminal device, wherein the first request indicates at least one location reporting accuracy for 5th generation (5G) non-3rd generation partnership project (non-3GPP) access of the terminal device, wherein a non-3GPP accuracy (n3gppAccuracy) attribute is used in the first request to indicate the at least one location reporting accuracy; and
send, to an access and mobility management function (AMF) entity, a second request for subscribing to an event exposure of location reporting for the terminal device, wherein the second request indicates the at least one location reporting accuracy.

19. The UDM according to claim 18, wherein the at least one location reporting accuracy comprises one or more of:
- a non-3GPP interworking function (N3IWF) information, which indicates that a change of N3IWF node used by the terminal device should be reported;
- a trusted non-3GPP gateway function (TNGF) used by the terminal device;
- an Internet protocol (IP) address information which indicates that a change of IP of the terminal device should be reported;
- a user datagram protocol (UDP) port used by the terminal device;
- a wireline access gateway function (WAGF) used by the terminal device;
- a line identifier of an access point used by the terminal device; and
- a hybrid fiber-coaxial (HFC) identifier of an access point used by the terminal device.

20. The UDM according to claim 18, wherein a locationFilterList attribute of an AmfEvent data structure is used in the second request to indicate the at least one location reporting accuracy.

21. An application function (AF) entity comprising:
at least one processor; and
at least one memory, the at least one memory containing instructions executable by the at least one processor, whereby the AF entity is operative to:
send, to a network exposure function (NEF) entity, a request for subscribing to an event exposure of location reporting for a terminal device, wherein the request indicates at least one location reporting accuracy for 5th generation (5G) non-3rd generation partnership project (non-3GPP) access of the terminal device; and
receive location information of the terminal device from the NEF entity.

* * * * *